(12) United States Patent
Tsai et al.

(10) Patent No.: US 12,349,082 B2
(45) Date of Patent: Jul. 1, 2025

(54) METHOD OF SMALL DATA TRANSMISSION AND RELATED DEVICE

(71) Applicant: SHARP KABUSHIKI KAISHA, Sakai (JP)

(72) Inventors: Hsin-Hsi Tsai, Taipei (TW); Heng-Li Chin, Taipei (TW); Mei-Ju Shih, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 373 days.

(21) Appl. No.: 17/555,517

(22) Filed: Dec. 20, 2021

(65) Prior Publication Data

US 2022/0210798 A1 Jun. 30, 2022

Related U.S. Application Data

(60) Provisional application No. 63/131,486, filed on Dec. 29, 2020, provisional application No. 63/131,500,
(Continued)

(51) Int. Cl.
*H04L 5/00* (2006.01)
*H04B 17/318* (2015.01)
(Continued)

(52) U.S. Cl.
CPC ......... *H04W 56/001* (2013.01); *H04L 5/0051* (2013.01); *H04L 5/0053* (2013.01);
(Continued)

(58) Field of Classification Search
None
See application file for complete search history.

(56) References Cited

U.S. PATENT DOCUMENTS 11,064,534 B2 * 7/2021 Agiwal ............... H04W 52/365
11,838,920 B2 * 12/2023 Lei .................... H04W 72/1268
(Continued)

OTHER PUBLICATIONS

3GPP, "Technical Specification, 3rd Generation Partnership Project; Technical Specification Group Radio Access Network; NR; User Equipment (UE) radio transmission and reception; Part 1: Range 1 Standalone (Release 16)." 3GPP TS 38.101-1 V16.0.0, Jun. 2019, pp. 1-268.
(Continued)

*Primary Examiner* — Sithu Ko
(74) *Attorney, Agent, or Firm* — ScienBiziP, P.C.

(57) ABSTRACT

A method for small data transmission (SDT) and related device are provided. In the method, a configuration from a base station (BS) is received. The configuration indicates a first reference signal received power (RSRP) threshold and a second RSRP threshold. A SDT procedure is initiated based on a configured grant (CG) resource in response to a RSRP of a downlink (DL) pathloss reference being higher than the first RSRP threshold. In response to initiating the SDT procedure based on the CG resource, the method further includes the following. A synchronization signal/physical broadcast channel block (SSB) from a SSB set in a case that the SSB has a RSRP above the second RSRP threshold. A random access (RA) procedure is initiated in response to none of SSBs in the SSB set having a RSRP above the second RSRP threshold.

18 Claims, 14 Drawing Sheets

Related U.S. Application Data filed on Dec. 29, 2020, provisional application No. 63/131,510, filed on Dec. 29, 2020.

(51) Int. Cl.
*H04W 56/00* (2009.01)
*H04W 72/1263* (2023.01)
*H04W 72/23* (2023.01)
*H04W 72/50* (2023.01)
*H04W 72/542* (2023.01)
*H04W 74/0833* (2024.01)
*H04W 76/30* (2018.01)

(52) U.S. Cl.
CPC ............ *H04L 5/006* (2013.01); *H04L 5/0085* (2013.01); *H04W 72/1263* (2013.01); *H04W 72/23* (2023.01); *H04W 72/535* (2023.01); *H04W 72/542* (2023.01); *H04W 74/0833* (2013.01); *H04W 76/30* (2018.02)

(56) References Cited

U.S. PATENT DOCUMENTS

| | | | |
|---|---|---|---|
| 2020/0100297 A1 | 3/2020 | Agiwal et al. | |
| 2021/0105809 A1 | 4/2021 | Park et al. | |
| 2022/0022247 A1* | 1/2022 | Agiwal | H04W 56/001 |
| 2022/0039192 A1 | 2/2022 | Palat et al. | |
| 2022/0095409 A1* | 3/2022 | Agiwal | H04W 74/0833 |
| 2023/0164773 A1* | 5/2023 | Alfarhan | H04W 72/52 370/329 |
| 2023/0262631 A1* | 8/2023 | Lei | H04W 56/0045 370/350 |
| 2023/0262688 A1* | 8/2023 | Kiilerich Pratas | H04W 72/1268 370/329 |

OTHER PUBLICATIONS

3GPP, "Technical Specification, 3rd Generation Partnership Project; Technical Specification Group Radio Access Network; NR; Physical layer procedures for control (Release 16)." 3GPP TS 38.213 V16.0.0, Dec. 2019, pp. 1-146.
3GPP, "Technical Specification, 3rd Generation Partnership Project; Technical Specification Group Radio Access Network; NR; Physical layer procedures for data (Release 16)." 3GPP TS 38.214 V16.0.0, Dec. 2019, pp. 1-147.
3GPP, "Technical Specification, 3rd Generation Partnership Project; Technical Specification Group Radio Access Network; NR; Medium Access Control (MAC) protocol specification (Release 16)." 3GPP TS 38.321 V16.0.0, Mar. 2020, pp. 1-141.
3GPP, "Technical Specification, 3rd Generation Partnership Project; Technical Specification Group Radio Access Network; NR; Physical channels and modulation (Release 16)." 3GPP TS 38.211 V16.0.0, Dec. 2019, pp. 1-129.
3GPP, "Technical Specification, 3rd Generation Partnership Project; Technical Specification Group Radio Access Network; NR; Multiplexing and channel coding (Release 16)." 3GPP TS 38.212 V16.0.0, Dec. 2019, pp. 1-145.
3GPP, "Technical Specification, 3rd Generation Partnership Project; Technical Specification Group Radio Access Network; NR; Radio Resource Control (RRC) protocol specification (Release 16)." 3GPP TS 38.331 V16.0.0, Mar. 2020, pp. 1-835.
3GPP, "Technical Specification, 3rd Generation Partnership Project; Technical Specification Group Radio Access Network; NR; Radio Link Control (RLC) protocol specification (Release 16)." 3GPP TS 38.322 V16.0.0, Mar. 2020, pp. 1-33.
3GPP, "Technical Specification, 3rd Generation Partnership Project; Technical Specification Group Radio Access Network; NR; Packet Data Convergence Protocol (PDCP) specification (Release 16)." 3GPP TS 38.323 V16.0.0, Mar. 2020, pp. 1-37.
Ericsson, "RRC aspects for SDT", 3GPP TSG-RAN WG2 #112e, R2-2009966, Nov. 2-13, 2020, pp. 1-5.
Samsung, "Configured Grant based Small Data Transmission", 3GPP TSG-RAN2 Meeting #112 Electronic, R2-2009094, Nov. 2-13, 2020, pp. 1-8.
Huawei et al., "Correction on DELTA_PREAMBLE and parameters for 2-step RA", 3GPP TSG-RAN WG2 Meeting #112-e, R2-2011005, Nov. 2-13, 2020, pp. 1-10.
CATT, "Analysis on SDT Procedures using CG", 3GPP TSG-RAN WG2 Meeting #112 electronic, R2-2009369, Nov. 2-13, 2020, pp. 1-5.
"International Search Report (Form PCT/ISA/210) of PCT/CN2021/142149," mailed on Mar. 2, 2022, pp. 1-4.
"Written Opinion of the International Searching Authority (Form PCT/ISA/237) of PCT/CN2021/142149," mailed on Mar. 2, 2022, pp. 1-4.
"Office Action of U.S. Appl. No. 17/555,523", issued on Sep. 14, 2023, p. 1-p. 18.
Huawei et al: "Discussion on CG-based scheme", 3GPP Draft; R2-2010281, 3GPP TSG-RAN WG2 #112-e, Online, Nov. 2-13, 2020 (Oct. 23, 2020).

\* cited by examiner

METHOD OF SMALL DATA TRANSMISSION AND RELATED DEVICE

CROSS-REFERENCE TO RELATED APPLICATION(S)

The present application claims the benefit of and priority to U.S. Provisional Patent Application Ser. No. 63/131,486, filed on Dec. 29, 2020, entitled "CONFIGURED UPLINK RESOURCE IN RRC INACTIVE", U.S. Provisional Patent Application Ser. No. 63/131,500, filed on Dec. 29, 2020, entitled "SMALL DATA TRANSMISSION BASED ON BEAM OPERATION", U.S. Provisional Patent Application Ser. No. 63/131,510, filed on Dec. 29, 2020, entitled "METHOD AND APPARATUS FOR SMALL DATA TRANSMISSION", the content of which is hereby incorporated fully by reference herein into the present disclosure.

FIELD

The present disclosure generally relates to wireless communications, and more particularly, to a method for small data transmission and related device.

BACKGROUND

With the tremendous growth in the number of connected devices and the rapid increase in user/network traffic volume, various efforts have been made to improve different aspects of wireless communication for the next-generation wireless communication system, such as the fifth generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

SUMMARY

The present disclosure is directed to a method for small data transmission (SDT) and related devices.

According to one or more exemplary embodiments of the disclosure, a method for SDT adapted for a user equipment (UE) is provided. The method includes, but is not limited to, the following steps. A configuration from a base station (BS) is received. The configuration indicates a first reference signal received power (RSRP) threshold and a second RSRP threshold. A SDT procedure is initiated based on a configured grant (CG) resource in response to a RSRP of a downlink (DL) pathloss reference being higher than the first RSRP threshold. In response to initiating the SDT procedure based on the CG resource, the method further includes the following. A synchronization signal/physical broadcast channel block (SSB) from a SSB set in a case that the SSB has a RSRP above the second RSRP threshold. A random access (RA) procedure is initiated in response to none of SSBs in the SSB set having a RSRP above the second RSRP threshold.

According to one or more exemplary embodiments of the disclosure, a UE is provided. The UE includes, but is not limited to, a transceiver, a memory, and a processor. The transceiver is used for transmitting or receiving signals. The memory is used for storing instruction. The processor is coupled to the transceiver and the memory. The processor is configured to execute the instruction to perform the following steps. A configuration from a base station (BS) is received. The configuration indicates a first reference signal received power (RSRP) threshold and a second RSRP threshold. A SDT procedure is initiated based on a configured grant (CG) resource in response to a RSRP of a downlink (DL) pathloss reference being higher than the first RSRP threshold. In response to initiating the SDT procedure based on the CG resource, the method further includes the following. A synchronization signal/physical broadcast channel block (SSB) from a SSB set in a case that the SSB has a RSRP above the second RSRP threshold. A random access (RA) procedure is initiated in response to none of SSBs in the SSB set having a RSRP above the second RSRP threshold.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
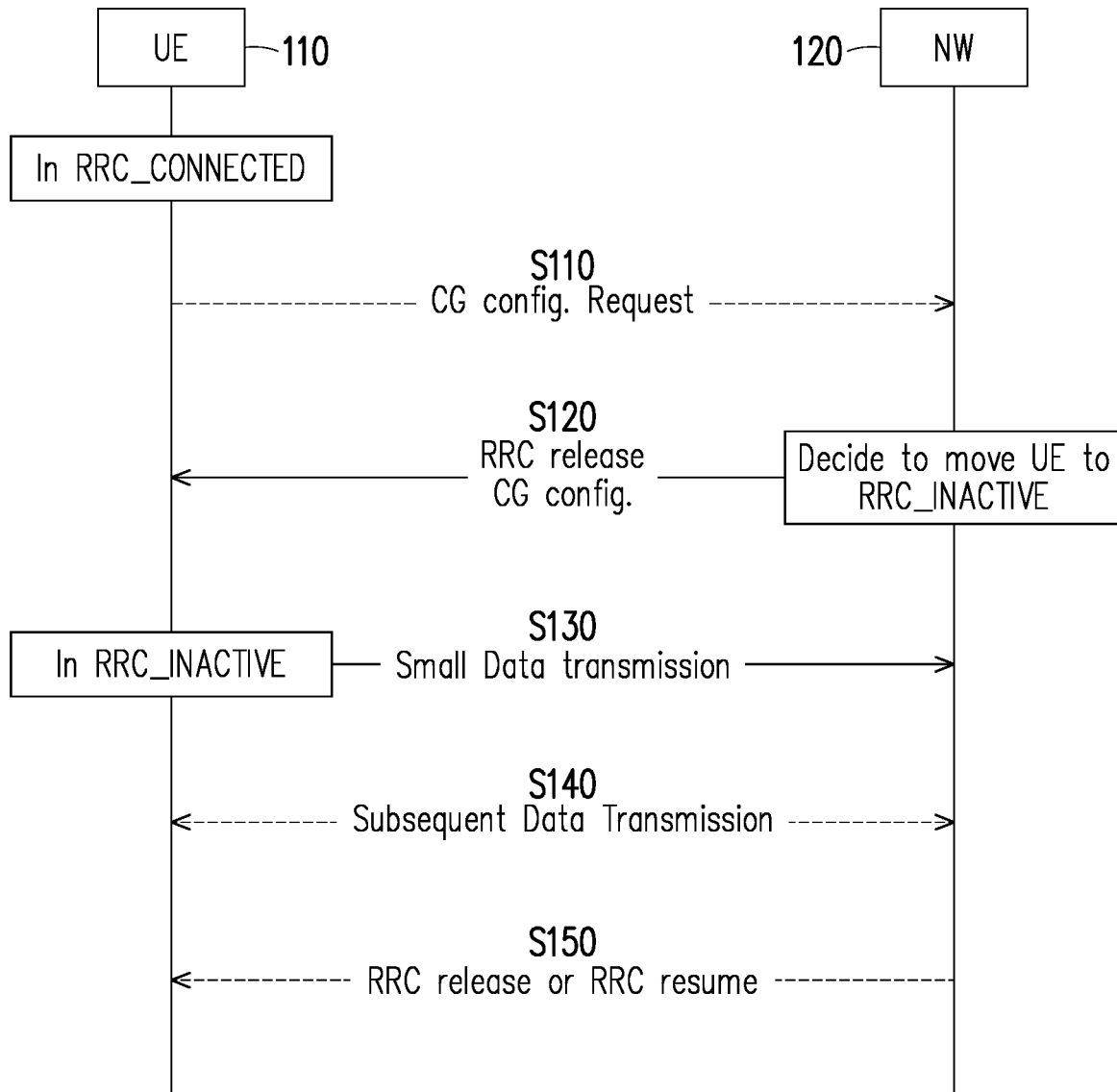
FIG. 1 is a flow chart that illustrates a potential procedure for CG-based SDT according to one of the exemplary embodiments of the disclosure.

The acronyms in the present disclosure are defined as follows and unless otherwise specified, the acronyms have the following meanings:

| Acronym | Full name |
| --- | --- |
| 3GPP | 3rd Generation Partnership Project |
| ACK | Acknowledgment |
| BS | Base Station |
| BSR | Buffer Status Request |
| BWP | Bandwidth Part |
| CE | Control Element |
| CG | Configured Grant |
| CORESET | Control Resource Set |
| C-RNTI | Cell-Radio Network Temporary Identifier |
| CRC | Cyclic Redundancy Check |
| CSI | Channel State Information |
| CS-RNTI | Configured Scheduling RNTI |
| CSS | Common Search Space |
| DCI | Downlink Control Information |
| DL | Downlink |
| DM-RS | Demodulation Reference Signal |
| DRB | Data Radio Bearer |
| FDD | Frequency-Division Duplex |
| FR | Frequency Range |
| HARQ | Hybrid Automatic Repeat reQuest |
| IE | Information Elements |
| L1 | Layer 1 |
| LCG | Logical Channel Group |
| LCH | Logical Channel |
| MAC | Medium Access Control |
| MCG | Master Cell Group |
| MPE | Maximum Permissible Exposure |
| Msg/MSG | Message |
| NACK | Negative-Acknowledgment |
| NR | New Radio |
| NW | Network |
| NUL | Normal Uplink |
| PBCH | Physical Broadcast Channel |
| PCell | Primacy Cell |
| PCMAX | Configured Maximum Output Power |
| PDCCH | Physical Downlink Control Channel |
| PDSCH | Physical Downlink Shared Channel |
| PDU | Protocol Data Unit |
| PHY | Physical Layer |
| PRACH | Physical Random Access Channel |
| PSCell | Primary Secondary Cell Group Cell |
| PUCCH | Physical Uplink Control Channel |
| PUSCH | Physical Uplink Shared Channel |
| QCL | Quasi Co Location |
| RA | Random Access |
| RACH | Random Access Channel |
| RAN | Radio Access Network |
| RAR | Random Access Response |
| Rel | Release |
| RNTI | Radio Network Temporary Identifier |
| RRC | Radio Resource Control |
| RS | Reference Signal |
| RSRP | Reference Signal Received Power |
| RSRQ | Reference Signal Received Quality |
| Rx | Reception |
| SCell | Secondary Cell |
| SCG | Secondary Cell Group |
| SCH | Synchronization Channel |
| SCS | Subcarrier Spacing |
| SDT | Small Data Transmission |
| SDU | Service Data Unit |
| SFN | System Frame Number |
| SI | System Information |
| SIB | System Information Block |
| SpCell | Special Cell |
| SRB | Signaling Radio Bearer |
| SS | Synchronization Signal |
| SSB | SS/PBCH Block |
| SUL | Supplementary Uplink |
| TA | Timing Advance |
| TB | Transport Block |
| TCI | Transmission Configuration Indicator |
| TDD | Time-Division Duplex |
| Tx | Transmission |
| TBS | Transport Block Size |
| TRP | Transmission and Reception Point |
| TRS | Tracking Reference Signal |
| UCI | Uplink Control Information |
| UE | User Equipment |
| UL | Uplink |

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The description uses the phrases "in one embodiment," or "in some embodiments," which may each refer to one or more of the same or different embodiments. The term "coupled" is defined as connected, whether directly or indirectly through intervening components, and is not necessarily limited to physical connections. The term "comprising," when utilized, means "including, but not necessarily limited to", which specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Any sentence, paragraph, (sub)-bullet, point, action, behavior, term, alternative, aspect, example, or claim described in the present disclosure may be combined logically, reasonably, and properly to form a specific method. Any sentence, paragraph, (sub)-bullet, point, action, behavior, term, alternative, aspect, example, or claim described in the present disclosure may be implemented independently and separately to form a specific method. Dependency, e.g., "based on", "more specifically", "in some implementations", "in one alternative", "in one example", "in one aspect", or etc., in the present disclosure is just one possible example in which would not restrict the specific method. One aspect of the present disclosure may be used, for example, in a communication, communication equipment (e.g., a mobile telephone apparatus, ad base station apparatus, a wireless LAN apparatus, and/or a sensor device, etc.), and integrated circuit (e.g., a communication chip) and/or a program, etc. According to any sentence, paragraph, (sub)-bullet, point, action, behavior, term, alternative, aspect, example, implementation, or claim described in the present disclosure, "X/Y" may include the meaning of "X or Y". According to any sentence, paragraph, (sub)-bullet, point, action, behavior, term, alternative, aspect, example, implementation, or claim described in the present disclosure, "X/Y" may also include the meaning of "X and Y". According to any sentence, paragraph, (sub)-bullet, point, action, behavior, term, alternative, aspect, example, implementation, or claim described in the present disclosure, "X/Y" may also include the meaning of "X and/or Y".

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned protocols.

A base station may include, but is not limited to, a node B (NB) as in the UNITS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PS Cell may belong to the SN. A Special Cell (SpCell) may be referred to a PCell of the MCG, or a PS Cell of the SCG, depending on whether the MAC entity is associated with the MCG or the SCG. Otherwise, the term Special Cell may refer to the PCell. A Special Cell may support a Physical Uplink Control Channel (PUCCH) transmission and contention-based Random Access (CBRA), and may always be activated. Additionally, for a UE in a RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

Some related technologies are introduced first.

SDT: SDT may be a UL data transmission in RRC_INACTIVE. The packet size (or data volume) of the UL data may be lower than a threshold. The UL data of SDT may be transmitted during a SDT procedure. The UL data of SDT may be transmitted via Msg 3 (e.g., based on a 4-step RA), via MsgA (e.g., based on a 2-step RA), and/or via a CG resource (e.g., CG type 1). The UL data of SDT may be transmitted based on a dynamic scheduling and/or a semi-persistent scheduling when the UE is in RRC_INACTIVE.

User Equipment (UE): The UE may be referred to as PHY/MAC/RLC/PDCP/SDAP/RRC entity. The PHY/MAC/RLC/PDCP/SDAP/RRC entity may be referred to the UE.

Network (NW): The NW may be a network node, a TRP, a cell (e.g., SpCell, PCell, PSCell, and/or SCell), an eNB, an gNB, and/or a base station.

Serving Cell: A PCell, a PSCell, or an SCell (Secondary Cell). The serving cell may be an activated or a deactivated serving cell.

Special Cell (SpCell): For Dual Connectivity operation the term Special Cell refers to the PCell of the MCG (Master Cell Group) or the PSCell of the SCG (Secondary Cell Group) depending on if the MAC entity is associated to the MCG or the SCG, respectively. Otherwise, the term Special Cell refers to the PCell. A Special Cell supports PUCCH (Physical Uplink Control CHannel) transmission and contention-based Random Access, and is always activated.

Beam (SSB/TRS/CSI-RS/assistance RS/TCI state): The term "beam" or "SSB/TRS/CSI-RS/assistance RS/TCI state" may be replaced by spatial filter. For example, when UE reports a preferred gNB TX beam, UE is essentially selecting a spatial filter used by gNB. The term "beam information" may be used to provide information about which beam/spatial filter is being used/selected. In one example, individual reference signals are transmitted by applying individual beams (spatial filters). Thus, the beam or the beam information may be represented by reference signal resource index(es). The beam may be DL and/or UL beam. The beam may be Tx beam and/or Rx beam. The beam may be UE beam and/or NW beam. The beam may be referred to reference signal (e.g., SSB/TRS/CSI-RS/assistance RS/TCI state), and/or TCI state. The beam may be indicated via a reference signal (e.g., SSB/TRS/CSI-RS/assistance RS/TCI state), and/or TCI state.

SSB parameters: The UE may be configured with one or more of the following configurations for SSB.

absoluteFrequencySSB: Frequency of the SSB to be used for this serving cell. SSB related parameters (e.g., SSB index) provided for a serving cell refer to this SSB frequency unless mentioned otherwise. The cell-defining SSB of the PCell is always on the sync raster. Frequencies are considered to be on the sync raster if they are also identifiable with a GSCN value (e.g., specified in 3GPP TS 38.101-1). If the field is absent, the SSB related parameters maybe absent, e.g., ssb-PositionsInBurst, ssb-periodicityServingCell and subcarrierSpacing in ServingCellConfigCommon IE. If the field is absent, the UE may obtain timing reference from the SpCell. This is only supported in case the SCell is in the same frequency band as the SpCell.

ssb-PositionsInBurst: Indicates the time domain positions of the transmitted SS-blocks in a half frame with SS/PBCH blocks as defined in 3GPP TS 38.213. The first/leftmost bit corresponds to SS/PBCH block index 0, the second bit corresponds to SS/PBCH block index 1, and so on. Value 0 in the bitmap indicates that the corresponding SS/PBCH block is not transmitted while value 1 indicates that the corresponding SS/PBCH block is transmitted. The network may configure the same pattern in this field as in the corresponding field in ServingCellConfigCommonSIB.

ssb-periodicityServingCell: The SSB periodicity in ms for the rate matching purpose. If the field is absent, the UE applies the value ms5. (e.g., specified in 3GPP TS 38.213)

ssbSubcarrierSpacing: Subcarrier spacing of SSB. The values 15 kHz or 30 kHz (FR1), and 120 kHz or 240 kHz (FR2) may be applicable.

TCI-state: The TCI-state may indicate quasi co-location information of the DM-RS antenna port for PDCCH reception in a respective CORESET. The TCI-state may be used for providing QCL relationships between the DL RS(s) in one RS Set (TCI-State) and the PDCCH DMRS ports.

Small Data Transmission (SDT)

NR supports RRC_INACTIVE state and UEs with infrequent (e.g. periodic and/or non-periodic) data transmission are generally maintained by the network in the RRC_INACTIVE state. Until Rel-16, the RRC_INACTIVE state doesn't support data transmission. Hence, the UE has to resume the connection (i.e., move to RRC_CONNECTED state) for any DL reception and/or UL data transmission. Connection setup and subsequently release to RRC_INACTIVE state happen for each data transmission regardless of how small and infrequent the data packets are. This results in unnecessary power consumption and signalling overhead.

Signalling overhead from RRC_INACTIVE state UEs due to transmission of small data packets is a general problem and will become a critical issue as the number of UEs increases in NR not only for network performance and efficiency but also for the UE battery performance. In general, any device that has intermittent small data packets in RRC_INACTIVE state will benefit from enabling small data transmission in RRC_INACTIVE state.

The key enablers for small data transmission in NR, namely the RRC_INACTIVE state, 2-step, 4-step RACH and/or configured grant type-1 have already been specified as part of legacy. Therefore, the aforementioned one or more embodiments build on these building blocks to enable small data transmission in RRC_INACTIVE state for NR.

The solution for UL small data transmission in RRC_INACTIVE may be service-agnostic, catering different service requirements. One or more of the following characteristics for a candidate solution may be assumed in one or more embodiments of the present disclosure:

Small data transmission can both operate with RACH-based schemes (e.g., 2-step and/or 4-step RACH procedure) and/or pre-configured PUSCH resources (e.g., reusing the configured grant type 1)

The UE AS context (e.g., UE Inactive AS Context) used for uplink data transmission in RRC_INACTIVE should be the same as the one used in state transition from RRC_INACTIVE to RRC_CONNECTED. The UE AS context is located and identified in the network via an "AS Context ID" which is allocated by the network and stored in the UE (and the network) when the UE goes to RRC_INACTIVE and is used to locate the AS context when the UE either tries to transmit small data and/or to perform a transition to RRC_CONNECTED. The UE AS Context can be stored in an "anchor"/source gNB and may be fetched to the new serving gNB when needed upon the triggering of small data transmission and/or transition from RRC_INACTIVE to RRC_CONNECTED. UE ID may be able to uniquely identify the UE context in the RAN.

Small data transmission may use the AS Context ID transmitted in the "first" message for contention resolution (e.g., at least when RACH is used). After the "first" message with small UL data is received the network should be able to inform the UE that it should move to RRC_CONNECTED via a DL RRC message (e.g., RRCConnection-Resume). The "first" message with small UL data could provide information to enable the network to apply Overload control and prioritization, if needed.

The UE provides in the "first" message with the initial uplink data transmission all necessary information to enable the network to move the UE to RRC_CONNECTED state or to enable the network to let the UE remain in RRC_INACTIVE, e.g., BSR.

Small data transmission solution may be able to support at least RLC ARQ mechanism.

The network should have the ability to perform a context update when the UE sends small data in RRC_INACTIVE. That update should rely on RRC signalling and should be done in the "second" message (e.g., RRCConnectionResume or a control response message triggered by small data transmission).

The UE context in RRC_INACTIVE may include the configuration of radio bearers, logical channels and/or security, etc.

The UE may maintain the same PDCP entity like in RRC_CONNECTED and maintains PDCP COUNT and SN of PDCP.

Multiple DRBs (and/or SRBs) can be maintained in RRC_INACTIVE, and data transmission may take place on the DRB associated with the concerned service. For small data transmission in RRC_INACTIVE the UE should use a currently configured DRB. If bearers with configured QoS are allowed to be used for UL small data transmission, the QoS may be still required to be met.

RRC Connection Resume Request may contain at least the required information for the network to perform contention resolution, identify the UE AS context and verify that this is the right UE. Upon receiving the response from the network (e.g., "RRC Connection Resume"), the UE should be able to identify this is the right network, perform contention resolution and receive DL data and either remain in RRC_INACTIVE or resume its previously suspended connection i.e., moving to RRC_CONNECTED.

DL transmissions/responses and subsequent UL transmissions may be supported without the UE having to move to RRC_CONNECTED.

HARQ ACK/NACK transmission can be supported in the same way as it is supported in LTE when MSG3 is transmitted (i.e., UE is expected to continuously monitor the DL PDCCH-like channel once it sends first UL packet, DL RLC ACK/NACK messages can be scheduled normally when a UE still listens to the DL channels).

UE provides information to enable the network to decide whether to leave the UE in RRC_INACTIVE or move to RRC_CONNECTED.

Configured Grant (CG)

With configured grants, a network device such as gNB can allocate uplink resources for the initial HARQ transmissions to UEs. Two types of configured uplink grants are defined:

With Type 1 (e.g., CG type 1), RRC directly provides the configured uplink grant (including the periodicity).

With Type 2 (e.g., CG type 2), RRC defines the periodicity of the configured uplink grant while PDCCH addressed to CS-RNTI can either signal and activate the configured uplink grant, or deactivate it; i.e., a PDCCH addressed to CS-RNTI indicates that the uplink grant can be implicitly reused according to the periodicity defined by RRC, until deactivated.

NW and/or RRC may configure the following parameters when the CG Type 1 is configured:

cs-RNTI: CS-RNTI for retransmission;
periodicity: periodicity of the configured grant Type 1;
timeDomainOffset: Offset of a resource with respect to SFN=0 in time domain;

timeDomainAllocation: Allocation of configured uplink grant in time domain which contains startSymbolAndLength (i.e., SLIV in 3GPP TS 38.214);

nrofHARQ-Processes: the number of HARQ processes for configured grant.

Upon configuration of a CG Type 1 for a Serving Cell by upper layers, the UE (or MAC entity) may:

store the uplink grant provided by upper layers as a configured uplink grant (for the indicated Serving Cell);

initialise or re-initialise the configured uplink grant to start in the symbol according to timeDomainOffset and S (derived from SLIV as specified in 3GPP TS 38.214), and to reoccur with periodicity.

CG-Based SDT

FIG. 1 is a flow chart that illustrates a potential procedure for CG-based SDT according to one of the exemplary embodiments of the disclosure. Referring to FIG. 1, note that the order of the steps in this Figure may be changed according to the embodiment. For example, the step S120 may happen before the step S110, and so on.

Step S110: When the UE 110 is in RRC_CONNECTED and/or RRC_INACTIVE, the UE 110 may send a CG configuration request to the network 120 to indicate its preference on configuration with CG type 1 for RRC_INACTIVE.

Step S120: The NW 120 may decide to move the UE 110 to RRC_INACTIVE by sending RRCRelease (including suspendconfig) message to the UE 110. The RRC release message may include a CG configuration to configure the CG resources to the UE 110. Alternatively, the CG configuration may be provided in RRC reconfiguration while the UE 110 is in RRC_CONNECTED. The CG configuration may include, for example, but not limited to, the following information:

CG periodicity
TBS
number for the implicit release of the CG resources
CG Timer
retransmission timer
number of HARQ process reserved for CG in SDT
RSRP threshold for SSB selection and association between SSB and CG resources
TA related parameters (e.g., TA timer)

Step S130: UE 110 may perform SDT via the CG resources (in RRC_INACTIVE) according to the CG configuration (e.g., configured in step 120).

Step S140: Subsequent data transmission may be the transmission of multiple UL and/or DL packets as part of the same SDT mechanism and without transitioning to RRC_CONNECTED (e.g., the UE is still in RRC_INACTIVE). UE 110 may monitor PDCCH on a specific search space (e.g., a SDT search space) via a specific RNTI (e.g., C-RNTI and/or CS-RNTI) to receive the dynamic scheduling for UL and/or DL new transmission and/or the corresponding retransmission. UE 110 may monitor PDCCH on a specific search space (e.g., a SDT search space) via a UE specific RNTI (e.g., C-RNTI and/or CS-RNTI) to receive the dynamic scheduling for the retransmission of CG type 1. UE 110 may perform subsequent data transmission via CG according to the CG configuration (e.g., configured in step S120).

Step S150: NW 120 may send a RRC release message to keep the UE 110 in RRC_INACTIVE or move the UE 110 to RRC_IDLE. Alternatively, NW 120 may send a RRC resume message to move the UE 110 to RRC_CONNECTED.

RA-Based SDT

Figure 2:
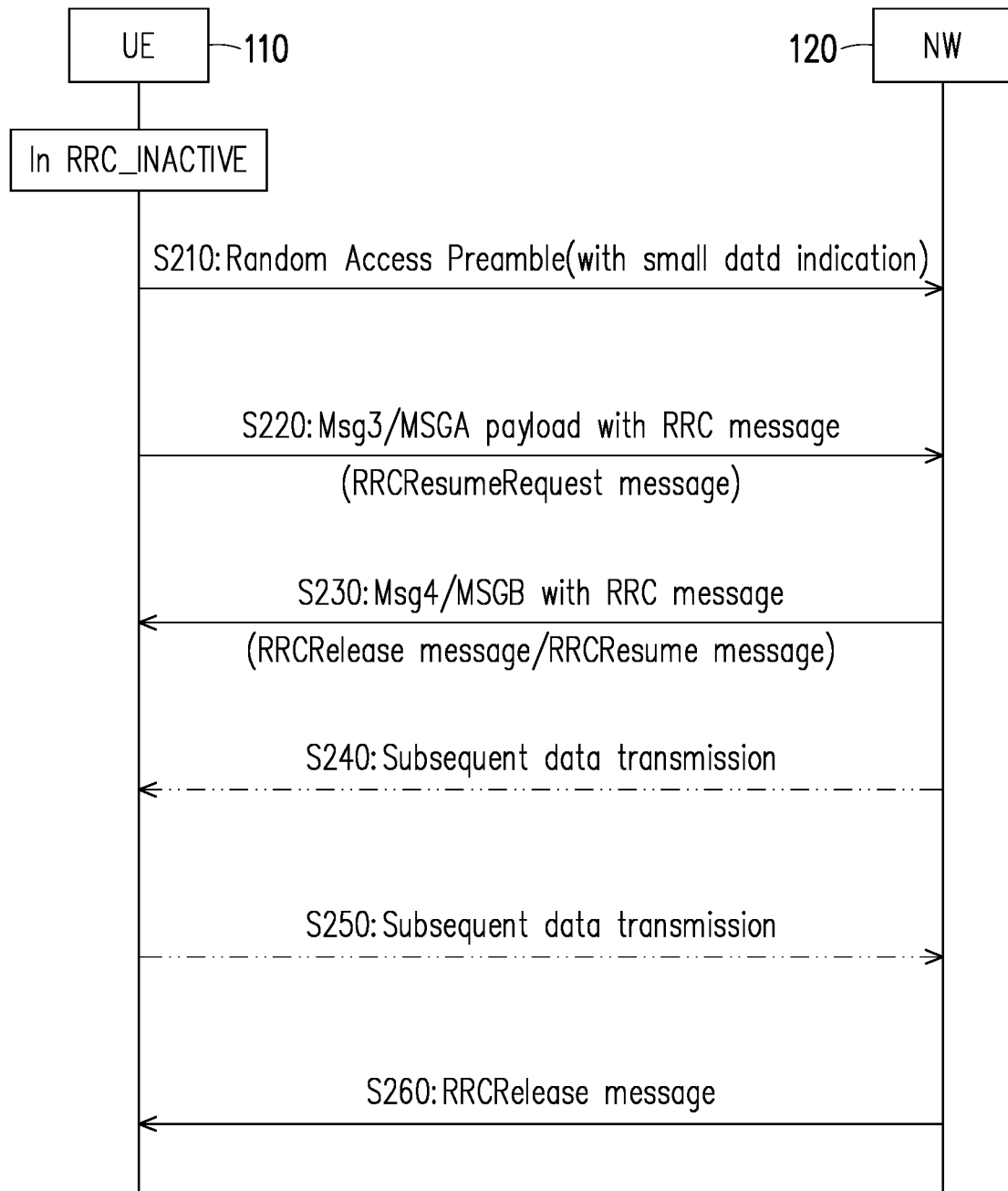
FIG. 2 is a flow chart that illustrates a potential procedure for RA-based SDT according to one of the exemplary embodiments of the disclosure.

FIG. 2 is a flow chart that illustrates a potential procedure for RA-based SDT according to one of the exemplary embodiments of the disclosure. Referring to FIG. 2, note that the order of the steps in this Figure may be changed according to the embodiment. For example, the step S220 may happen before the step S210, and so on.

Step S210: When a UE 110 in RRC_INACTIVE has UL data available for transmission, it may initiate a RA-based SDT procedure for the transmission of the UL data. The UE 110 may select either 4-step RA type or 2-step RA type. Moreover, the PRACH resource for RA-based SDT procedure (e.g., RA preamble with small data indication) and normal RA procedure (e.g., RA preamble without small data indication) may be different. Here, the UE 110 may select the PRACH resource for RA-based SDT procedure.

Step S220: After transmitting the RA preamble, the UE 110 may transmit a RRC message through MSG3 (when 4-step RA type is selected) or MSGA (when 2-step RA type is selected). The RRC message may be a RRCResumeRequest message. In addition to the RRC message, MAC CE (e.g., BSR) and DRB data packet (e.g., small data) can be included in MSG3/MSGA as well.

Step S230: Once the MSG3/MSGA is transmitted, the UE 110 may monitor RA-RNTI/MSGB-RNTI for MSG4/MSGB, in which the contention resolution ID will be carried. In addition, the NW may transmit RRC message in MSGA/MSGB. The RRC message may be a RRCRelease message (with suspendConfig IE) or a RRCResume message. The UE 110 may stay in RRC_INACTIVE if it receives a RRCRelease message (with suspendConfig IE) or enters RRC_CONNECTED if it receives a RRCResume message. In addition, MAC CE (e.g., BSR) and SRB/DRB data packet (e.g., small data) can be included in MSG4/MSGB as well.

Step S240/S250: Once the RA procedure is successfully completed, the UE 110 may monitor a specific RNTI (e.g., C-RNTI/CS-RNTI) for subsequent data transmission. Subsequent data transmission may be the transmission of multiple UL and/or DL packets as part of the same SDT mechanism and without transitioning to RRC_CONNECTED (e.g., the UE 110 is still in RRC_INACTIVE). UE 110 may monitor PDCCH via a specific RNTI (e.g., C-RNTI/CS-RNTI) to receive the dynamic scheduling for UL and/or DL new transmission and/or the corresponding retransmission. UE 110 may monitor PDCCH via a UE specific RNTI (e.g., C-RNTI or CS-RNTI) to receive the dynamic scheduling for the retransmission of CG type 1.

Step S260: Once the RRCRelease message (with suspendConfig IE) is received, the UE 110 may stop monitoring the C-RNTI and enter normal INACTIVE state.

Beam Operation for CG-Based SDT

In order to perform SDT in RRC_INACTIVE, UE may need to have beam alignment with the network to enable data transmission. In RA-based SDT, beam alignment with the network is acquired through RA procedure. For CG-based SDT, how to acquire beam alignment with the network needs to be considered due to skipping of RA procedure.

Figure 3:
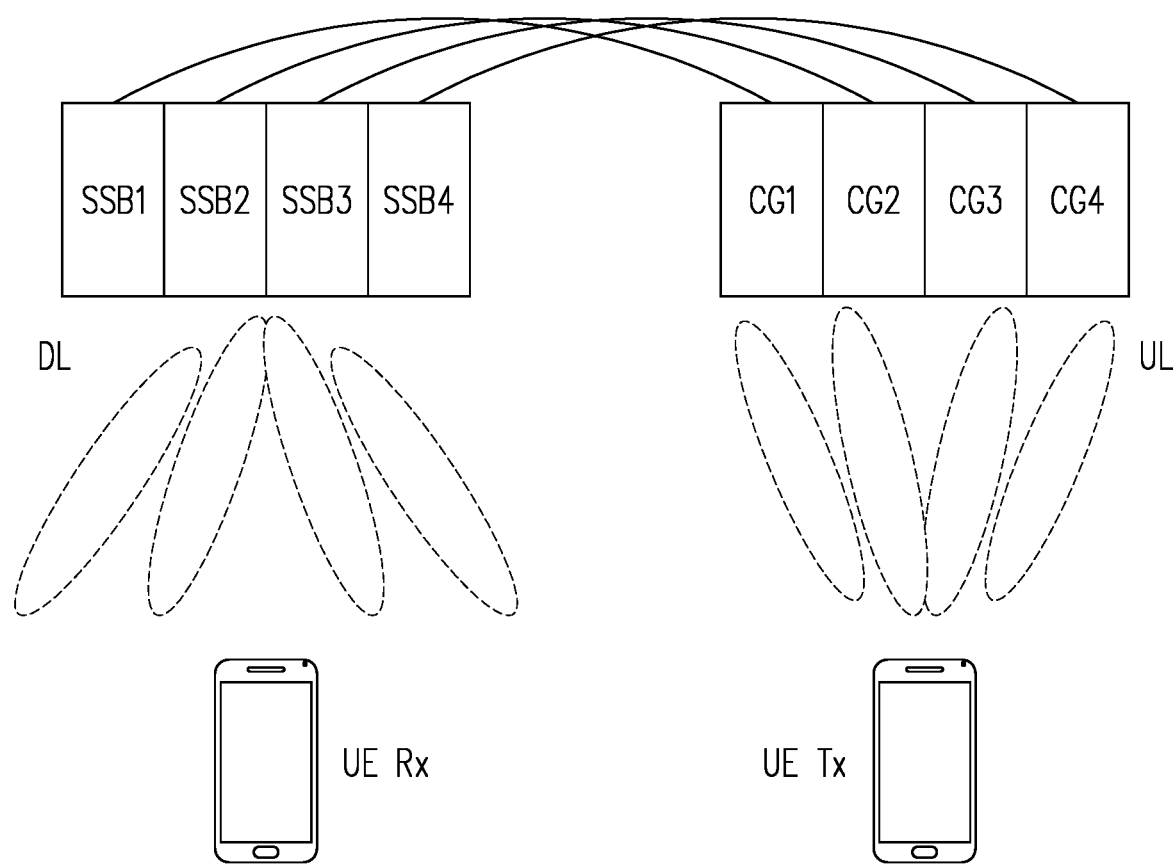
FIG. 3 is a schematic diagram that illustrates an association between SSBs and CG resources and/or CG resource occasions according to one of the exemplary embodiments of the disclosure.

One implementation is to rely on the association between CG resources and SSBs. Note that the SSB or SSB index may be referred to beam and the beam may be referred to SSB or SSB index in this disclosure. FIG. 3 is a schematic diagram that illustrates an association between SSBs and CG resources and/or CG resource occasions according to one of the exemplary embodiments of the disclosure. To acquire the initial beam alignment, as illustrated in FIG. 3. Since UE may perform SSB-based measurement in RRC_INACTIVE, the SSB measurement results may be used to select the proper beam for CG transmission. When NW receives UL data on a specific CG resource, the NW may know on which DL beam (e.g., SSB/TRS/CSI-RS/assistance RS/TCI state) to send the DL response based on the association between SSBs and CG resources. When UE receives the DL response, which may be a PDCCH/DCI indication and/or a L1 ACK, UE may consider that it acquires the beam alignment with the network.

A Potential Procedure of Beam Operation for CG-Based SDT:

The CG resources and the association with SSBs and/or the SSB set may be provided by the NW and stored, by UE, as UE Inactive AS content when UE is sent to RRC_INACTIVE state.

UE may perform SSB-based measurement in RRC_INACTIVE and select a SSB with RSRP above a threshold (e.g., RSRP-ThresholdSSB) amongst the associated SSBs when initiating CG-based SDT and/or before transmitting small data via CG resource. The UE may transmit the UL data via a CG resource which is associated with the selected SSB. Then the NW may know which DL beam (e.g., SSB/TRS/CSI-RS/assistance RS/TCI state) is qualified for the UE. Additionally and alternatively, the UE may explicitly/implicitly indicate the beam information (e.g., the selected/candidate/qualified SSB index(es)) to the NW via the CG resource. The beam information may be indicated via RRC signaling, MAC signaling (e.g., MAC CE) and/or PHY signaling.

UE may receive a DL response from NW based on the selected SSB.

Association/Mapping between Beam/SSB and CG

Figure 4:
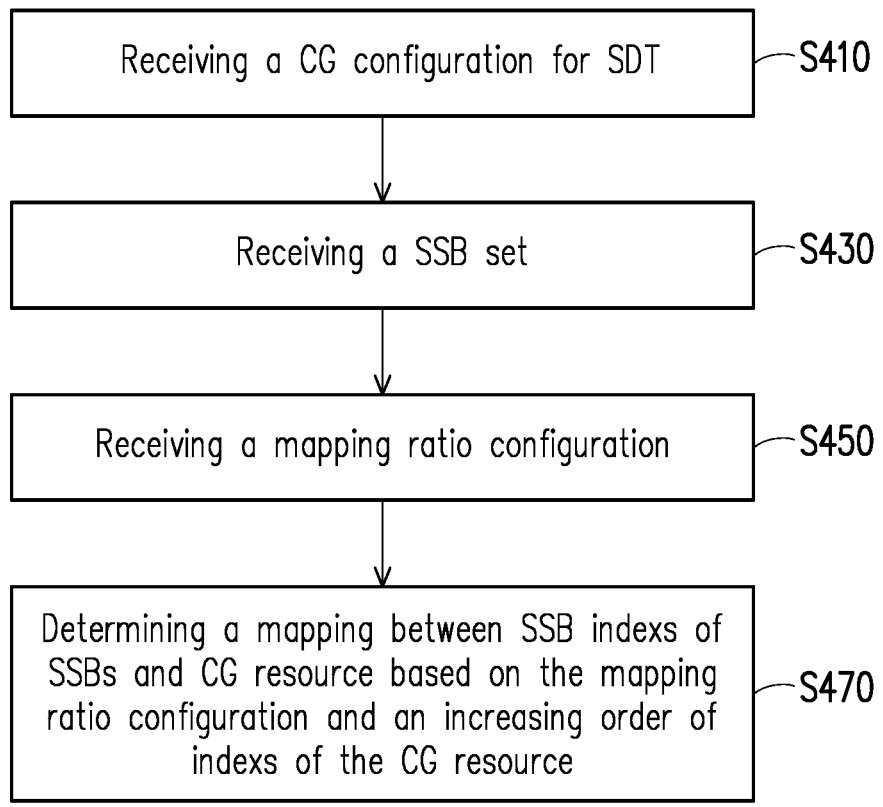
FIG. 4 is a flow chart of a method adapted for UE for SDT according to one of the exemplary embodiments of the disclosure.

FIG. 4 is a flow chart of a method adapted for UE for SDT according to one of the exemplary embodiments of the disclosure. Referring to FIG. 4, UE receives a CG configuration for SDT from a BS (step S410). The UE receives a SSB set from the BS (step S430). The UE receives a mapping ratio configuration from the BS (step S450). The mapping ratio configuration indicates a number of SSBs per CG resource. The SSBs are configured by the SSB set, and the CG resource is configured by the CG configuration for SDT. The UE determines a mapping between SSB indexes of the SSBs and the CG resource based on the mapping ratio configuration and an increasing order of indexes of the CG resource (step S470).

In one embodiment, a CG configuration for SDT is indicated by NW to UE. The CG resource/occasion may be configured by the CG configuration for SDT.

In one embodiment, a configuration of the association/mapping between SSBs/SSB indexes and CG resources/occasions may be included in the CG configuration. Specifically, the CG configuration may be used to configure the CG resource(s) for SDT and/or for the UE in RRC_INACTIVE.

In one embodiment, a mapping ratio configuration may be included in the CG configuration for SDT.

In one embodiment, a CG configuration may be included in a dedicated RRC resource, a RRC reconfiguration message, and/or a RRC release message (including suspendconfig).

In one embodiment, a configuration of the association/mapping between beam (e.g., SSB/TRS/CSI-RS/assistance RS/TCI state) and CG resources/occasions may include a parameter to indicate that a SSB (index) is associated with/mapped to which CG resource/occasion. Specifically, a SSB index may be associated with/mapped to one or more than one CG resource/occasion. Alternatively, a CG resource/occasion may be associated with/mapped to one or more than one SSB (index).

In one embodiment, NW may indicate the same transport block size (TBS) for all the CG resource/occasions which are associated with different beams.

In one embodiment, a configuration of the association/mapping between SSB(s)/SSB index(es) and CG resource(s)/occasion(s) may be indicated from the NW to the UE via a dedicated RRC message, a RRC release message (including suspendconfig), a RRC reconfiguration message, and/or system information (e.g., SIBx, where x is an integer).

In one embodiment, one or more SSBs may be configured by a SSB set indicated from NW to UE. That is, one SSB set may include one or more SSBs/SSB indexes.

In one embodiment, a SSB set or one or more SSBs/SSB indexes may be configured from NW for one UE via a RRC release message (including suspendconfig) or via system information (e.g., SIBx, where x is an integer).

In some embodiments, a SSB set or one or more SSBs/SSB indexes may be configured from NW for one UE via system information. For example, SSB set or SSB (index) may be provided in SIB 1 (e.g., by ssb-PositionsInBurst) and/or in ServingCellConfigCommon IE. That is, the system information may be indicated by SIB1 or a ServingCellConfigCommon IE.

In one embodiment, a SSB set or one or more SSBs/SSB indexes may be configured from NW for one UE via system information if the SSB set or SSB(s)/SSB index(es) is not configured via a RRC release message.

In one embodiment, UE may receive the configuration of CG and/or the association/mapping between SSBs/SSB indexes and CG resource(s)/CG occasion(s) in RRC reconfiguration message when the UE is in RRC_CONNECTED. The UE may store the configuration when the UE is in RRC_CONNECTED and/or when the UE enters RRC_INACTIVE. Then, when the UE switches to RRC_INACTIVE, the UE may apply the stored configuration. The UE may apply the stored configuration when the UE receives a RRC release message (with suspend configuration). The UE may apply the stored configuration when the UE receives a RRC release message (with suspend configuration) and a specific indication included in the RRC release message indicates the UE to apply it.

In one embodiment, a configuration of the association/mapping between SSBs/SSB indexes and CG resources/occasions may include a mapping ratio configuration indicated by NW, and the UE may be configured with the mapping ratio configuration. The mapping ratio configuration indicates a number of SSB(s) per CG resource/occasion. For example, a value "oneEighth" may correspond to one SSB associated with 8 CG resources/occasions, a value "oneFourth" may correspond to one SSB associated with 4 CG resources/occasions, and so on.

In some embodiments, based on a mapping ratio configuration, one UE may be provided with a number N of SSB (index) associated with one CG resource/occasion. In one embodiment, if N<1, one SSB (index) may be associated with/mapped to 1/N consecutive (valid) CG resource/occasion. In one embodiment, if N>=1, all consecutive N SSB (index) may be associated with/mapped to one CG resource/occasion.

In some embodiments, a mapping between SSB (index) and CG resource/occasion may be determined based on an increasing order of indexes of CG resource/occasion. Specifically, SSB (index) may be mapped to a (valid) CG resource/occasion based on one or more of the following rules:

In one alternative, the indexes of CG resource/occasion are the specific indexes for CG. For example, the mapping may be determined in increasing order of specific indexes for CG (e.g., DM-RS resource indexes, CG indexes, CG period indexes, etc.).

In some implementations, each consecutive number of N SSB indexes may be mapped to valid CG resource/occasions (e.g., a PUSCH occasion) and associated DM-RS resources.

First, in increasing order of DM-RS resource indexes within a PUSCH occasion, where a DMRS resource index may be determined first in an ascending order of a DM-RS port index and second in an ascending order of a DM-RS sequence index.

Second, in increasing order of CG period indexes (e.g., a PUSCH configuration period indexes)

In one alternative, the indexes of CG resource/occasion may be frequency resource indexes for CG resource/occasions. For example, the mapping may be determined in increasing order of frequency resource indexes for frequency (multiplexed) CG resource/occasions.

In one alternative, the indexes of CG resource/occasion may be time resource indexes for CG resource/occasions. For example, the mapping may be determined in increasing order of resource indexes for CG resource/occasions and/or CG period configured by a configuration (e.g., a PUSCH configuration).

In one alternative, the indexes of CG resource/occasion may be indexes for symbols/slots/subframes/ms/s. For example, the mapping may be determined in increasing order of indexes for symbols/slots/subframes/ms/s (e.g., PUSCH symbols/slots/subframes).

In one alternative, the indexes of CG resource/occasion may be indexes for CG period. For example, the mapping may be determined in increasing order of indexes for CG period.

In one alternative, the indexes of CG resource/occasion may be indexes for DM-RS resource. For example, for demodulation scheme, the mapping may be determined in increasing order of indexes for DM-RS resource.

In one alternative, the CG resource/occasion may be referred to as a PUSCH resource/occasion.

Figure 5:
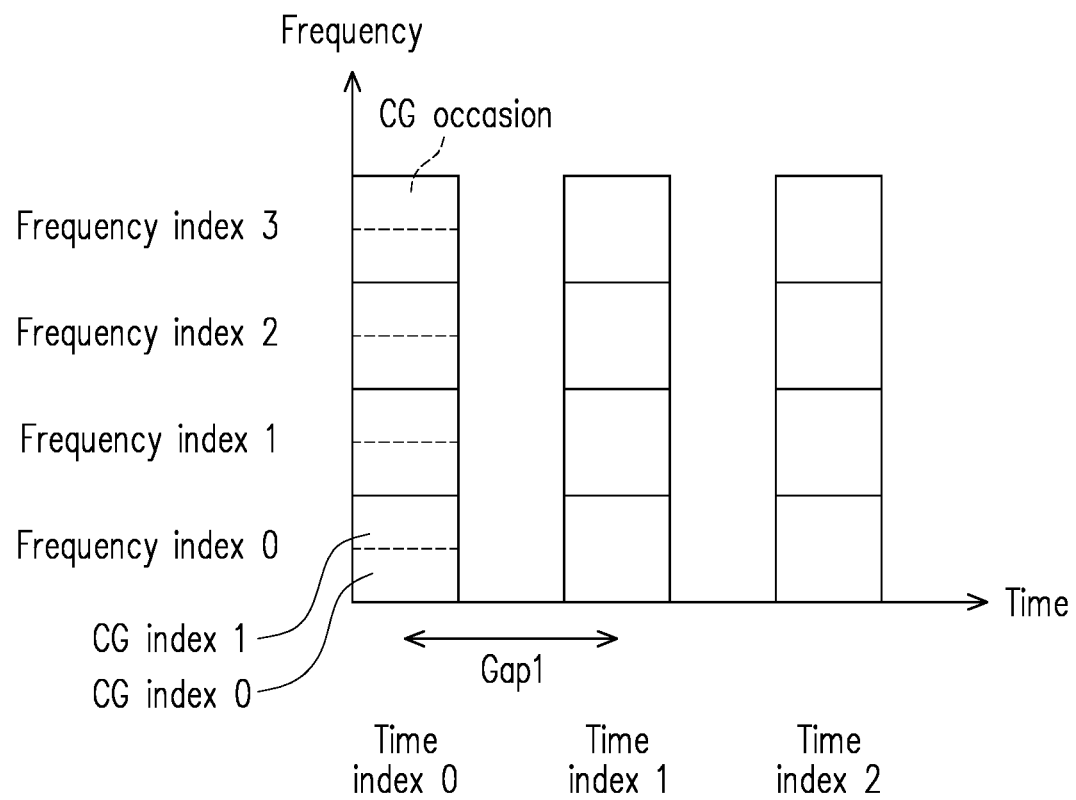
FIG. 5 is a schematic diagram that illustrates indexes of CG resource/occasion according to one of the exemplary embodiments of the disclosure.

FIG. 5 is a schematic diagram that illustrates indexes of CG resource/occasion according to one of the exemplary embodiments of the disclosure. Referring to FIG. 5, a CG resource/occasion may include 2 CG indexes (e.g., CG index 0 and CG index 1). A Time resource/occasion (index) may include 4 CG resource/occasions on frequency domain (e.g., from frequency index 0 to frequency index 3 as an increasing order of frequency resource indexes). In time domain, a period/gap for CG resource/occasion may be configured to the UE. For example, a period/gap is allocated between time index 0 and time index 1. Time index 0, time index 1, and time index 2 would form an increasing order of time resource indexes.

Figure 6A:
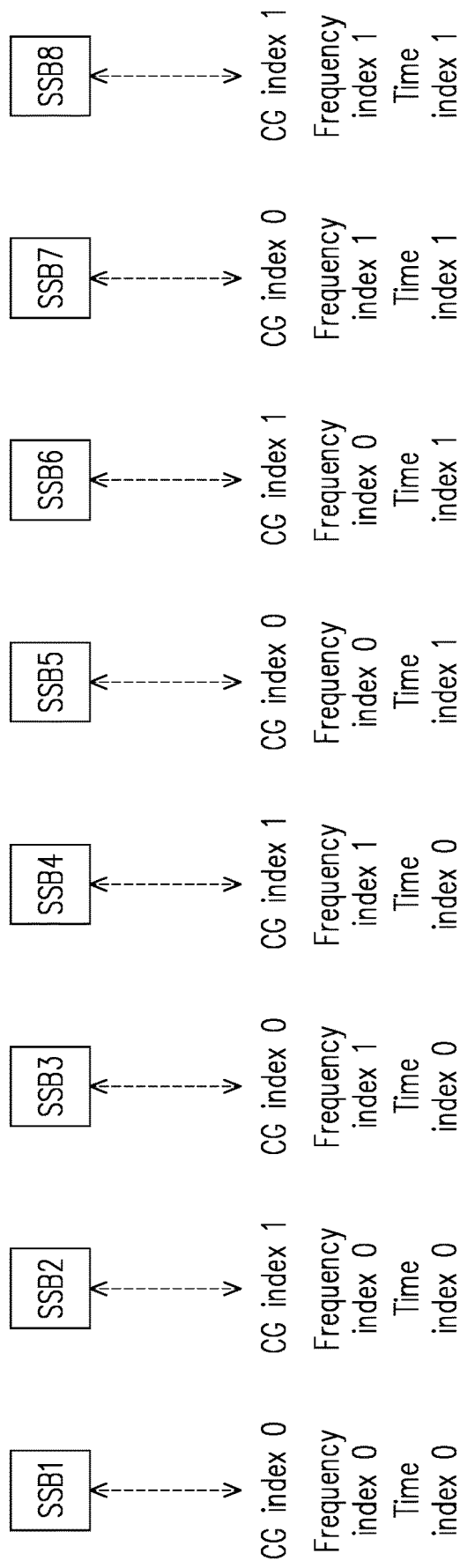
FIG. 6A is a schematic diagram that illustrates a mapping between SSB (index) and CG resource/occasion according to one of the exemplary embodiments of the disclosure.

FIG. 6A is a schematic diagram that illustrates a mapping between SSB (index) and CG resource/occasion according to one of the exemplary embodiments of the disclosure. Referring to FIG. 6A, the association/mapping between SSBs and CG resources/occasion may be determined based on FIG. 5 as an example. The SSB set may include 8 SSBs/SSB indexes. Each SSB (index) may be associated with/mapped to a combination of a CG index, a frequency index, and/or a time index. One combination of the CG index, the frequency index, and the time index may be one CG resources/occasion. For example, SSB1 ma associated with/mapping to the combination of CG index 0, frequency index 0, and time index 0, SSB2 is associated with/mapping to the combination of CG index 1, frequency index 0, and time index 0, and so on. Therefore, the mapping ratio configuration is one SSB per CG resource.

In one embodiment, UE may select a SSB from the SSB set during a SDT procedure. The selected SSB from the SSB set has a RSRP above a corresponding RSRP threshold. In one embodiment, UE may select CG resource corresponding to the selected SSB in response to determining the association/mapping between a SSB index of the selected SSB and the CG resource/occasion.

In one embodiment, a SSB set or one or more SSBs/SSB indexes may be configured from NW for one UE via a RRC release message or via system information.

In one alternative, a SSB set may be a SSB subset (e.g., configured by a SDT-SSB-subset configuration). The SSB set may be indicated by NW for SSB to CG PUSCH mapping within one CG configuration. If the SSB set is absent, the UE may assume the SSB set includes all actually transmitted SSBs configured by SIB1.

In some embodiments, a UE may be provided by a SSB set with a number of SS/PBCH block indexes to map to a number of valid CG/PUSCH occasions for PUSCH transmissions over an association period. If the UE is not provided with the SSB set, the UE may determine the mapping from the value of ssb-PositionsInBurst in SIB1 or by ServingCellConfigCommon. A CG/PUSCH occasion for a PUSCH transmission may be defined by a time resource and/or a frequency resource and/or may be associated with a DM-RS provided by cg-DMRS-Configuration for the configuration of PUSCH transmissions.

In some embodiments, a SSB set or one or more SSBs/SSB indexes is configured from NW for one UE via system information. For example, SSB set or SSB (index) may be provided in SIB1 (e.g., by ssb-PositionsInBurst) and/or in ServingCellConfigCommon IE. That is, the system information is indicated by SIB1 or a ServingCellConfigCommon IE.

In one embodiment, the CG configuration for SDT configures multiple CG resources/occasions, and a group/set/bundle of transmission via these CG resources/occasions are mapped to the same SSB/SSB index in the SSB set.

In some embodiments, a UE may be configured with a beam resource set/list (e.g., SSB set/list (e.g., indicated by sdt-SSB-subset)) which is used for beam measurement for CG-based SDT. The UE may perform beam measurement before/during SDT via CG. The UE may select a beam/SSB (from the SSB set) based on the SSB measurement.

In some embodiments, a UE may determine the next available CG resource/occasion from the CG resource/occasion corresponding to the selected beam/SSB.

In some embodiments, a UE may select a CG resource/occasion randomly with equal probability amongst the consecutive CG resource/occasions corresponding to the selected beam/SSB.

In some embodiments, UE may take into account the possible measurement gaps when determining the next available CG/PUSCH occasion corresponding to the selected beam/SSB. For example, the UE may not consider the CG/PUSCH occasion which is overlapped with the measurement gap and/or a PRACH occasion (in time domain) as an available/valid CG/PUSCH occasion. For example, the UE may consider a CG/PUSCH occasion is valid if it does not overlap with a PRACH occasion.

Alternatively, during the measurement gaps, the UE may or may not perform the measurements. The UE may determine the available CG/PUSCH occasion corresponding to the selected beam/SSB, which is the result of the measurement before the measurement gap. After the measurement gaps, the UE may determine the available CG occasion corresponding to the newly selected beam/SSB, which is the result of the measurement during the measurement gaps, for SDT.

In some embodiments, an association period, starting from frame 0 and/or frame x, for mapping N SS/PBCH block indexes to PUSCH occasions may be the smallest value in the set determined by the PUSCH configuration period such that SS/PBCH block indexes may be mapped at least once to the PUSCH occasions within the association period, e.g., where a UE obtains N from the value of ssb-PositionsInBurst in SIB1 or in ServingCellConfigCommon. If after an integer number of SS/PBCH block indexes to PUSCH occasions mapping cycles within the association period there is a set of CG resource/occasions that are not mapped to N SS/PBCH block indexes, no SS/PBCH block indexes are mapped to the set of CG resource/occasion. An association pattern period may include one or more association periods and is determined so that a pattern between CG resource/occasion and SS/PBCH block indexes may repeat at most every X msec. CG resource/occasion not associated with SS/PBCH block indexes after an integer number of association periods, if any, are not used for UL transmissions.

In some embodiments, an association period, starting from frame x, for mapping N SS/PBCH block indexes, from the number of SS/PBCH block indexes, to valid PUSCH occasions and/or the associated DM-RS resources may be the smallest value in the set determined by the PUSCH configuration period such that N SS/PBCH block indexes are mapped at least once to valid PUSCH occasions and associated DM-RS resources within the association period.

In some embodiments, a UE may be provided with a number of SS/PBCH block indexes associated with a PUSCH occasion and a DM-RS resource by an IE sdt-SSB-perCG-PUSCH. If after an integer number of SS/PBCH block indexes to PUSCH occasions mapping cycles within the association period there is a set of CG/PUSCH occasions that are not mapped to N SS/PBCH block indexes, no SS/PBCH block indexes are mapped to the set of CG/PUSCH occasions. An association pattern period includes one or more association periods and may be determined so that a pattern between CG/PUSCH occasions and SS/PBCH block indexes repeats at most every X msec (e.g., 640 ms). CG/PUSCH occasions not associated with SS/PBCH block indexes after an integer number of association periods, if any, are not used for PUSCH transmissions.

HARQ ID Determination

Based on 3GPP TS 38.321, the HARQ process ID for UL CG transmission and/or DL SPS reception may be derived in some ways as described below, e.g., An equation without an offset An equation with an offset UE implementation to select a HARQ Process ID among the HARQ process IDs available for the configured grant configuration.

For configured uplink grants neither configured with harq-ProcID-Offset2 nor with cg-RetransmissionTimer, the HARQ Process ID associated with the first symbol of a UL transmission is derived from the following equation:

$$\text{HARQ Process } ID = [\text{floor}(\text{CURRENT\_symbol/periodicity})] \text{ modulo nrofHARQ-Processes} \quad (1)$$

For configured uplink grants with harq-ProcID-Offset2, the HARQ Process ID associated with the first symbol of a UL transmission is derived from the following equation:

$$\text{HARQ Process } ID = [\text{floor}(\text{CURRENT\_symbol/periodicity})] \text{ modulo nrofHARQ-Processes+harq-ProcID-Offset2} \quad (2)$$

where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in 3GPP TS 38.211.

For configured uplink grants configured with cg-RetransmissionTimer, the UE embodiment selects a HARQ Process ID among the HARQ process IDs available for the configured grant configuration. The UE shall prioritize retransmissions before initial transmissions. The UE shall toggle the NDI in the CG-UCI for new transmissions and not toggle the NDI in the CG-UCI in retransmissions.

Noted that CURRENT_symbol refers to the symbol index of the first transmission occasion of a repetition bundle that takes place.

Noted that If cg-RetransmissionTimer is not configured, a HARQ process is not shared between different configured grant configurations in the same BWP.

For CG-based SDT, there are some different characteristics from legacy CG mechanisms. For example, the CG for SDT may (only) be used/configured when the UE is in RRC_INACTIVE. The CG for SDT may be configured by RRC release (with suspendconfig) message. The CG for SDT may be configured with the association/mapping between beam/SSB and CG resource/occasion. The number of (UL) HARQ processes may be specifically configured for CG-based SDT. Therefore, there may be a need to define the new methods for the UE to determine the HARQ process ID for CG used for SDT.

Configuration

In one embodiment, UE may be configured with some parameters for HARQ process ID determination, e.g., periodicity: periodicity of the configured grant Type 1 (for SDT and/or for RRC_INACTIVE)

nrofHARQ-Processes: the number of HARQ processes for configured grant (for SDT and/or for RRC_INACTIVE)

harq-ProcID-OffsetX: offset of HARQ process for configured grant (for SDT and/or for RRC_INACTIVE)

In one embodiment, the parameters for HARQ process ID determination may be configured in a dedicated RRC message, a RRC release (including suspendconfig) message, a RRC reconfiguration message, and/or system information (e.g., SIBx, where x may be an integer). The parameters for HARQ process ID determination may be configured in a CG configuration (e.g., for SDT).

In one embodiment, UE may receive the parameters for HARQ process ID determination in RRC reconfiguration message when the UE is in RRC_CONNECTED. The UE may store the configuration when the UE is in RRC_CONNECTED and/or in RRC_INACTIVE. Then, when the UE switches to RRC_INACTIVE, the UE may apply the stored configuration. The UE may apply the stored configuration when the UE receives a RRC release message (with suspend configuration). The UE may apply the stored configuration when the UE receives a RRC release message (with suspend configuration) and a specific indication included in the RRC release message indicates the UE to apply it.

Single HARQ Process

In some embodiments, UE may only support one HARQ process for SDT.

In one embodiment, the nrofHARQ-Processes may not be configured by the NW (e.g., the IE of the nrofHARQ-Processes may be absent).

In one embodiment, the value of the nrofHARQ-Processes may be set to 1 by NW.

In one embodiment, the HARQ process ID associated with the first symbol of a SDT may be derived from the following equation:

$$\text{HARQ Process } ID=[\text{floor}(\text{CURRENT\_symbol/periodicity})] \text{ modulo } 1 \quad (3)$$

In one embodiment, for SDT via CG, UE may (only) use a specific HARQ process identifier (e.g., HARQ process ID 0). The specific HARQ process identifier may be pre-defined in specification for the UE and/or may be configured by NW (e.g., in the CG configuration). In one embodiment, the preconfigured HARQ process identifier may be overridden by the HARQ process identifier that is configured by NW (e.g., in the CG configuration).

In one embodiment, if UE has only been configured with one HARQ process for SDT, the UE may ignore the HARQ process field in the DCI that is received on the specific CORESET/search space. In one embodiment, if the UE has only been configured with one HARQ process for SDT, the HARQ process field in the DCI may be absent. In one embodiment, if the UE has only been configured with one HARQ process for SDT, the HARQ process field in the DCI may always need to be indicated as a specific HARQ process ID (e.g., HARQ process ID 0).

Multiple HARQ Processes

In some embodiments, UE may support multiple HARQ processes for SDT.

In one embodiment, HARQ process ID associated with the first symbol of a SDT may be derived from the following equation:

$$\text{HARQ Process } ID=[\text{floor}(\text{CURRENT\_symbol/periodicity})] \text{ modulo nrofHARQ-Processes} \quad (4)$$

In one embodiment, HARQ process ID associated with the first symbol of a SDT may be derived from the following equation:

$$\text{HARQ Process } ID=[\text{floor}(\text{CURRENT\_symbol/periodicity})] \text{ modulo nrofHARQ-Processes+harq-ProcID-OffsetX} \quad (5)$$

In one embodiment, UE embodiment selects a HARQ Process ID among the HARQ process IDs available for the configured grant configuration (for SDT).

In one embodiment, UE may indicate a HARQ process ID information to NW via a specific signaling which is transmitted based on the SDT via CG. The specific signaling may be a PHY signaling, UCI, MAC CE, and/or RRC signaling.

In one embodiment, UE may prioritize the HARQ process ID for retransmission over the HARQ process ID for new/initial transmission when selecting a HARQ process ID for a CG resource for SDT.

In one embodiment, UE may prioritize the HARQ process ID for new/initial transmission over the HARQ process ID for retransmission when selecting a HARQ process ID for a CG resource for SDT.

In one embodiment, UE may select a HARQ process (for a CG) which does not have data waiting for retransmission.

For example, the UE may not select a HARQ process (for a CG) when a specific timer (e.g., a CG timer and/or a window/timer for monitoring PDCCH) for the HARQ process is running. For example, the UE may only select a HARQ process (for a CG) when a specific timer (e.g., a CG timer and/or a window/timer for monitoring PDCCH) for the HARQ process is not running.

In one embodiment, after transmitting the UL data (e.g., small data in RRC_INACTIVE), UE may (re)start a window/timer (e.g., configured in the CG configuration), e.g., at the first PDCCH occasion as specified in 3 GPP TS 38.213 from the end of the UL data transmission.

In one embodiment, UE may monitor a PDCCH (e.g., on a specific search space configured in the CG configuration) by a specific RNTI (e.g., C-RNTI/CS-RNTI) while the window/timer is running.

For the monitoring of the PDCCH, in one embodiment, UE may attempt to detect a specific DCI (e.g., DCI format 1_0) with CRC scrambled by a specific RNTI (e.g., C-RNTI/CS-RNTI) during the window/timer.

In one embodiment, the window/timer may be restarted at the first symbol of the earliest CORESET the UE is configured to receive PDCCH for a specific search space set (e.g., Type1-PDCCH CSS set), that may be at least X (e.g., one) symbol (or a preconfigured offset), after the last symbol of a time occasion corresponding to the transmission of the UL data. The symbol duration and/or the offset may correspond to the SCS for the specific search space set. The length of the window/timer may be in number of symbol/slot/subframe/ms, based on the SCS for the specific search space set.

Beam/SSB-Based HARQ Process ID Determination

It is noted that the association/mapping between beam (e.g., SSB/TRS/CSI-RS/assistance RS/TCI-state) and CG resource/occasion may be configured. Noted that the details are depicted in the aforementioned embodiment. Before/when using a CG to perform SDT, UE may select a beam/SSB to determine which CG resource/occasion should be used for UL transmission. Then, the UE may transmit the UL data on a specific CG resource/occasion which is associated with the selected beam (e.g., the selected SSB).

In one embodiment, different beams/SSBs may be associated with different CG resource/occasions in different resource occasion (e.g., different symbol, mini-slot, slot, subframe, system frame, ms, s, etc.). For example, UE may be configured with two beams (e.g., two SSBs). A first beam (e.g., a first SSB) may be associated with a first CG resource/occasion in a first symbol, and a second beam (e.g., a second SSB) may be associated with a second CG resource/occasion in a second symbol. Based on the current HARQ process ID determination method, if the UE selects different beams/SSBs for a SDT via CG, the UE may derive different HARQ process IDs for transmission. Since the UE may only select one of the beams for transmission, it may be beneficial to align the HARQ process ID for the CG resource/occasions associated with different beams for a single UL transmission.

Figure 6B:
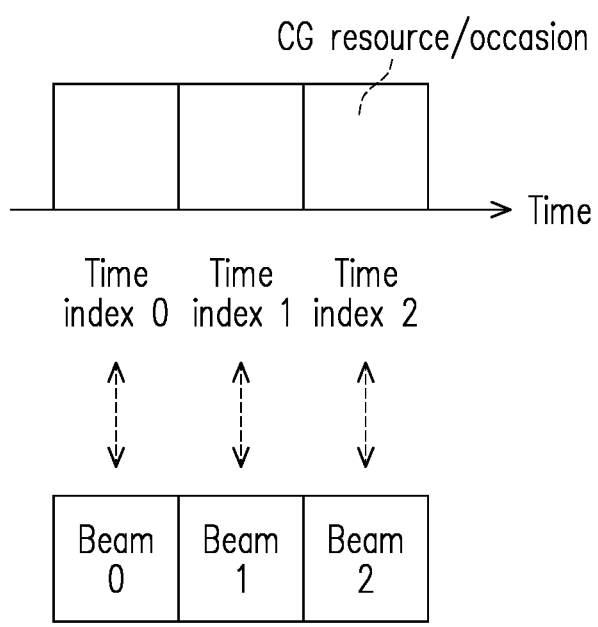
FIG. 6B is a schematic diagram that illustrates an association/mapping between SSB (index) and CG resource/occasion according to one of the exemplary embodiments of the disclosure.

FIG. 6B is a schematic diagram that illustrates an association/mapping between SSB (index) and CG resource/occasion according to one of the exemplary embodiments of the disclosure. Referring to FIG. 6B, a UE may be configured with a beam 0, a beam 1, and a beam 2, wherein the beam 0 is associated with a CG resource/occasion in time index 0, the beam 1 is associated with a CG resource/occasion in time index 1, and the beam 2 is associated with a CG resource/occasion in time index 2. The UE may perform one or more of the following embodiments:

In one embodiment, UE may derive the HARQ process ID for a CG based on a specific time index (e.g., symbol index) of a CG resource/occasion. The CG resource/occasion is one of the multiple CG resources/occasions associated with the configured beams/SSBs (beam/SSB set/list), e.g., regardless of which beam/SSB is selected by the UE.

In one example, the UE may derive the HARQ process ID for a CG based on the first (or the earliest or the lowest) time index of a CG resource/occasion. The CG resource/occasion is one of the multiple CG resources/occasions associated with the configured beams/SSBs (beam/SSB set/list), e.g., regardless of which beam/SSB is selected by the UE. Take an example based on FIG. 6B, the UE may derive the HARQ process ID for a CG based on time index 0 which is associated with the first CG resource/occasion, e.g., no matter whether the UE selects beam 0, beam 1, or beam 2.

In one example, the UE may derive the HARQ process ID for a CG based on the last (or the latest or the highest) time index of a CG resource/occasion, wherein the CG resource/occasion is one of the multiple CG resources/occasions associated with the configured beams/SSBs (beam/SSB set/list), e.g., regardless of which beam is selected by the UE. Take an example based on FIG. 6B, the UE may derive the HARQ process ID for a CG based on time index 2 which is associated with the last CG resource/occasion, e.g., no matter whether the UE selects beam 0, beam 1, or beam 2.

In one embodiment, CURRENT_symbol may refer to a specific time index (e.g., symbol index) of a CG resource/occasion. The CG resource/occasion is one of the multiple CG resources/occasions associated with the configured beams/SSBs (beam/SSB set/list), e.g., regardless of which beam/SSB is selected by the UE.

In one example, CURRENT_symbol may refer to the first (or the earliest or the lowest) time index of a CG resource/occasion. The CG resource/occasion is one of the multiple CG resources/occasions associated with the configured beams/SSBs (beam/SSB set/list), e.g., regardless of which beam/SSB is selected by the UE. Take an example based on FIG. 6B, CURRENT_symbol may refer to time index 0 which is associated with the first CG resource/occasion, e.g., no matter whether the UE selects beam 0, beam 1, or beam 2.

In one example, CURRENT_symbol may refer to the last (or the latest or the highest) time index of a CG resource/occasion. The CG resource/occasion is one of the multiple CG resources/occasions associated with the configured beams/SSBs (beam/SSB set/list), e.g., regardless of which beam/SSB is selected by the UE. Take an example based on FIG. 6B, CURRENT_symbol may refer to time index 2 which is associated with the last CG resource/occasion, e.g., no matter whether the UE selects beam 0, beam 1, or beam 2.

In one embodiment, UE may derive the HARQ process ID for a CG based on a time index (e.g., symbol index) of a CG resource/occasion which is associated with one of the configured beams/SSBs (beam/SSB set/list) with a specific index, e.g., regardless of which beam/SSB is selected by the UE.

In one example, UE may derive the HARQ process ID for a CG based on a time index (e.g., symbol index) of a CG resource/occasion which is associated with the configured beam/SSB with the lowest index, regardless of which beam is selected by the UE. Take an example based on FIG. 6B, the UE may derive the HARQ process ID for a CG based on time index 0 which is associated with the beam with lowest index, e.g., no matter whether the UE selects beam 0, beam 1, or beam 2.

In one example, UE may derive the HARQ process ID for a CG based on a time index (e.g., symbol index) of a CG resource/occasion which is associated with the configured beam/SSB with the highest index, regardless of which beam is selected by the UE. Take an example based on FIG. 6B, the UE may derive the HARQ process ID for a CG based on time index 2 which is associated with the beam with highest index, e.g., no matter whether the UE selects beam 0, beam 1, or beam 2.

In one example, the specific index may be associated with a default beam/SSB. Alternatively, the specific index of the default beam/SSB may be pre-configured by NW. Alternatively, the specific index of the default beam/SSB may be pre-defined in the specification.

In one embodiment, CURRENT_symbol may refer to a time index (e.g., symbol index) of a CG resource/occasion which is associated with one of the configured beams/SSBs (beam/SSB set/list) with a specific index, e.g., regardless of which beam/SSB is selected by the UE.

In one example, CURRENT_symbol may refer to a time index (e.g., symbol index) of a CG resource/occasion which is associated with the configured beam/SSB with the lowest index, regardless of which beam/SSB is selected by the UE. Take an example based on FIG. 6B, CURRENT_symbol may refer to time index 0 which is associated with the beam/SSB with lowest index, e.g., no matter whether the UE selects beam 0, beam 1, or beam 2.

In one embodiment, multiple CG resources/occasions associated with the configured beams/SSBs (beam/SBB set/list) may be configured/considered as a group/set/bundle for transmission. UE may derive the HARQ process ID based on one of the CG resource/occasion in the group/set/bundle of the multiple CG resource/occasions (associated with the configured beams/SSBs (beam/SSB set/list). The bundle of transmission via the multiple CG resource/occasions may be associated with the same beam/SSB. In one example, UE may derive the HARQ process ID for a CG resource/occasion based on one of transmission occasions (e.g., the first transmission occasion) of the group/set/bundle that takes place.

In one example, CURRENT_symbol may refer to the symbol index of one of transmission occasions (e.g., the first transmission occasion) of the group/set/bundle that takes place.

In one embodiment, the number of CG resource/occasions and/or the beams/SSBs within a group/set/bundle may be configured by a specific value (e.g., provided by NW, by RRC layer, and/or by PHY layer).

In one embodiment, the number of CG resource/occasions and/or the beams/SSBs within a group/set/bundle may be based on the number of beam/SSB indexes in a resource list.

In one embodiment, for the determination of the HARQ process ID for CG transmission for SDT and/or for RRC_INACTIVE, UE may derive the HARQ process ID based on a specific time-unit level (e.g., slot or subframe), rather than based on symbol level. In one example, HARQ Process ID=[floor(CURRENT_slot/periodicity)] modulo nrof-HARQ-Processes.

In one embodiment, the CG resource/occasion may be a transmission occasion for SDT.

In one embodiment, for each Serving Cell and/or each configured uplink grant, if configured and activated, UE may set the HARQ process ID to the HARQ process ID associated with this PUSCH duration if/when the PUSCH duration of the configured uplink grant is associated with the selected beam/SSB.

In one embodiment, UL-SCH resources/occasion (of a CG for SDT) may be considered available/valid if the MAC entity/UE has configured (type 1) CG (when UE is in RRC_INACTIVE), and the CG resource/occasion of the CG configuration is associated with the selected beam/SSB.

In one embodiment, UL-SCH resources/occasion (of a CG for SDT) may be considered not available/valid if the MAC entity/UE has configured (type 1) CG (when UE is in RRC_INACTIVE), but the CG resource/occasion of the CG configuration is not associated with the selected beam/SSB.

Figure 7:
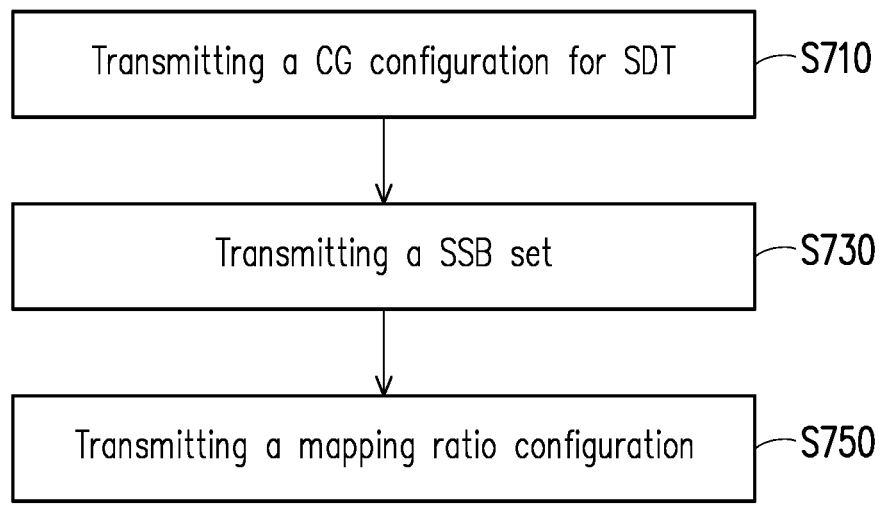
FIG. 7 is a flow chart of a method adapted for network for SDT according to one of the exemplary embodiments of the disclosure.

FIG. 7 is a flow chart of a method adapted for network for SDT according to one of the exemplary embodiments of the disclosure. Referring to FIG. 7, the network (e.g., BS) transmits a CG configuration for SDT to UE (step S710). The network transmits a SSB set to the UE (step S730). The network transmits a mapping ratio configuration to UE (step S750). A mapping between SSB indexes of SSBs and CG resource/occasion is determined based on the mapping ratio configuration and an increasing order of indexes of the CG resource/occasion. The details of step S710 to step S750 could be referred to FIG. 4-FIG. 6B and would be omitted.

SDT Procedure

Figure 8:
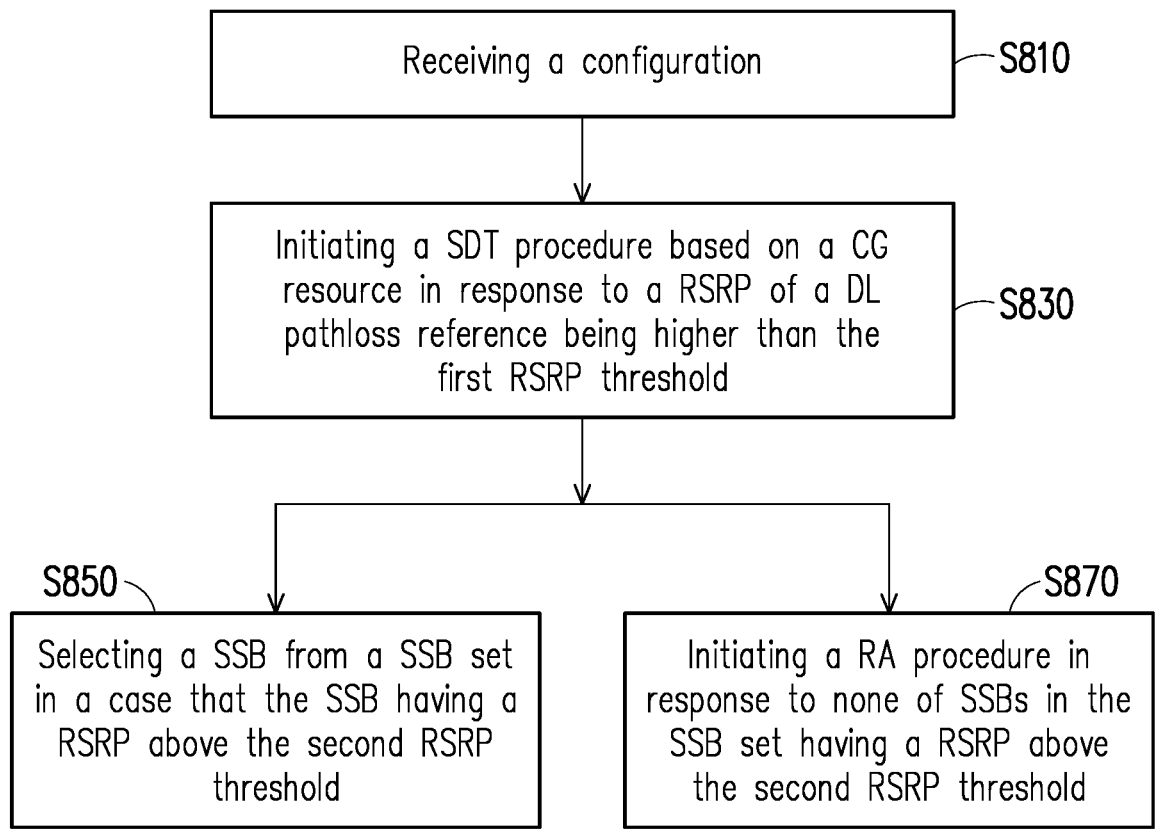
FIG. 8 is a flow chart of a method adapted for UE for SDT according to one of the exemplary embodiments of the disclosure.

FIG. 8 is a flow chart of a method adapted for UE for SDT according to one of the exemplary embodiments of the disclosure. Referring to FIG. 8, UE receives a configuration from NW (e.g., BS) (step S810). The configuration may indicate a first RSRP threshold and/or a second RSRP threshold. The UE may initiate a SDT procedure based on a CG resource (e.g., provided by a CG configuration for SDT) in response to a RSRP of a DL pathloss reference being higher than the first RSRP threshold (step S830). In response to initiating the SDT procedure based on the CG resource: The UE may select a SSB from a SSB set in a case that the SSB having a RSRP above the second RSRP threshold (step S850). The UE may initiate a RA procedure in response to none of SSBs in the SSB set having a RSRP above the second RSRP threshold (step S870).

Figure 9:
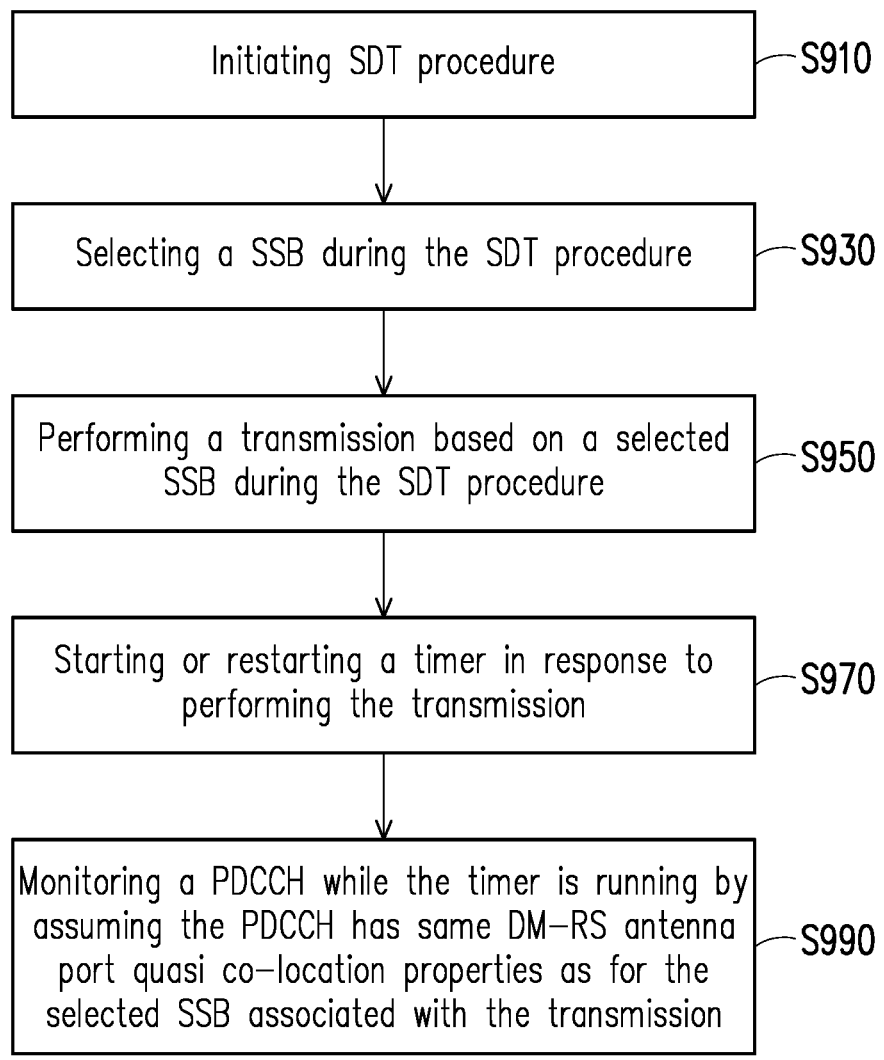
FIG. 9 is a flow chart of a method adapted for UE for SDT according to one of the exemplary embodiments of the disclosure.

FIG. 9 is a flow chart of a method adapted for UE for SDT according to one of the exemplary embodiments of the disclosure. Referring to FIG. 9, UE initiates a SDT procedure (step S910). The UE selects a SSB during the SDT procedure (step S930). The UE performs a transmission based on a selected SSB during the SDT procedure (step S950). The UE starts or restarts a timer in response to performing the transmission (step S970). The UE monitors a PDCCH while the timer is running by assuming the PDCCH has the same DM-RS antenna port quasi co-location properties as for the selected SSB associated with the transmission (S990).

Figure 10:
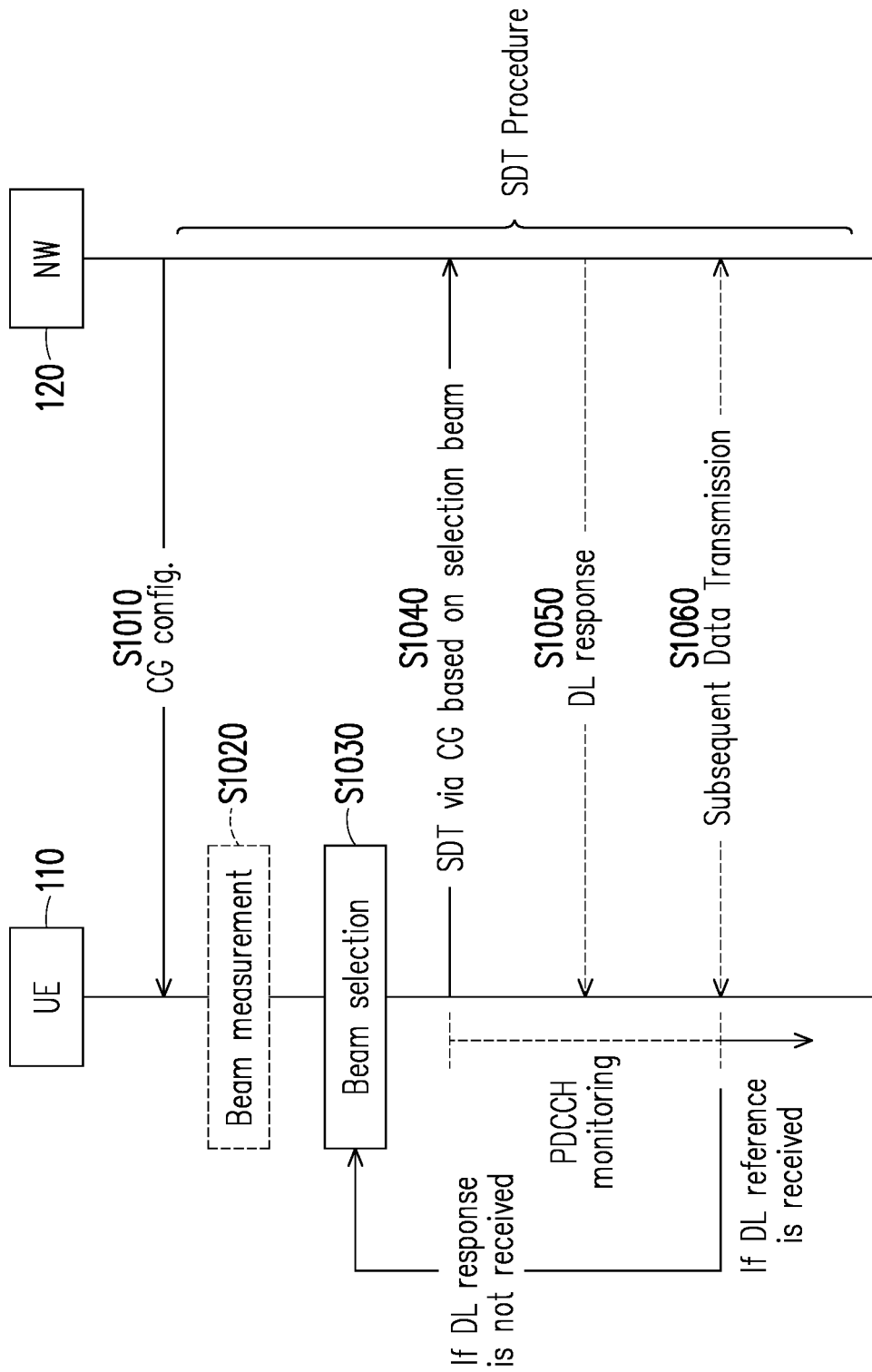
FIG. 10 is a flow chart that illustrates CG-based SDT according to one of the exemplary embodiments of the disclosure.

Specifically, FIG. 10 is a flow chart that illustrates CG-based SDT according to one of the exemplary embodiments of the disclosure. Referring to FIG. 10, for CG-based SDT, UE 110 may initiate/perform a procedure for SDT (e.g., SDT procedure). The UE 110 may receive a CG configuration (e.g., via a RRC release message and/or RRC reconfiguration message) from NW 120 (step S1010).

In one embodiment, UE may receive the CG configuration (for SDT) via a RRC release with suspend configuration message.

In one embodiment, UE may receive the CG configuration in RRC reconfiguration message when the UE is in RRC_CONNECTED. The UE may store the CG configuration when the UE is in RRC_CONNECTED and/or when the UE is in RRC_INACTIVE. Then, when the UE switches/enters to RRC_INACTIVE, the UE may apply the stored configuration. The UE may apply the stored configuration when the UE receives a RRC release message (with suspend configuration). The UE may apply the stored configuration when the UE receives a RRC release message (with suspend configuration) and a specific indication included in the RRC release message indicates the UE to apply it.

In one embodiment, the CG configuration may include beam information (e.g., SSB/TRS/CSI-RS/assistance RS/TCI-state set/list), CG information (e.g., periodicity, TBS, number for the implicit release of the CG resources, CG Timer, retransmission timer, number of HARQ process reserved for CG in SDT, LCH/DRB information (e.g., logicalChannelIdentity, DRB-identity), RSRP threshold for SSB selection and association/mapping between SSB (index) and CG resources, TA related parameters (e.g., TA timer), etc.), and/or the association/mapping between the beam and the CG resource/occasion.

SDT Procedure Initialization

In one embodiment, UE may trigger/initiate a SDT procedure based on some conditions. The SDT procedure may be a RA procedure (e.g., RA-based SDT). Alternatively, the SDT procedure may be a procedure for transmission via CG (e.g., CG-based SDT). More specifically, there may be two types of SDT procedure. One type is based on RA procedure (e.g., 2-step or 4-step RA). The other type is based on CG (e.g., type 1 CG). The UE may transmit UL/DL data during the SDT procedure. There may be only one SDT procedure ongoing at any point in time. The SDT procedure may only be triggered/initiated when the UE is in RRC_INACTIVE.

In one embodiment, a SDT procedure may be triggered/initiated by NW or by UE (e.g., RRC entity, MAC entity) itself In one embodiment, UE may trigger/initiate a SDT procedure if/when the UE receives a DL indication from NW. In one embodiment, the DL indication may be a RRC release (with suspendconfig) message. In one embodiment, the DL indication may include a configuration for SDT. Specifically, the DL indication may include a CG configuration (for SDT). In one embodiment, the DL indication may include a field/parameter to trigger/initiate the SDT procedure.

In one embodiment, UE may trigger/initiate a SDT procedure when the UE enters RRC_INACTIVE.

In one embodiment, UE may trigger/initiate a SDT procedure when/after determining that at least one CG configuration/resource is valid. Noted that the criterions for the determination of CG validity are depicted in this disclosure below.

In one embodiment, UE may trigger/initiate a SDT procedure when/after at least one LCH/SRB/DRB which is configured for SDT have pending data. For example, data is available for transmission for only those SRB/DRBs for which SDT is enabled.

In one embodiment, LCH/SRB/DRB configured for SDT may not be suspended/released (or the LCH/DRB configured for SDT may be resumed) when the UE transits from RRC_CONNECTED to RRC_INACTIVE after the RRC connection release procedure.

In one embodiment, LCH/SRB/DRB configured for SDT may be configured by NW via dedicated RRC signaling, e.g., in the CG configuration.

In one embodiment, UE may trigger/initiate the SDT procedure if data volume for transmission (e.g., for SDT) is lower than a configured threshold for SDT. Noted that the data volume may count the volume of the LCH/SRB/DRB configured for SDT.

In one embodiment, UE may trigger/initiate the SDT procedure if a RSRP is larger/higher than a configured RSRP threshold for SDT. For example, if the RSRP of DL pathloss reference is higher than a corresponding RSRP threshold, UE triggers/initiates a SDT procedure. Alternatively, if the RSRP of DL pathloss reference is not higher than the corresponding RSRP threshold, UE stops/cancels the SDT procedure or consider the SDT procedure is unsuccessful. In one embodiment, the RSRP threshold used for comparing with a RSRP of DL pathloss reference may be configured by a SDT configuration.

In one embodiment, if CG resource/occasion is not valid, UE may initiate an RA procedure for SDT.

Beam Measurement

Referring FIG. 10, the UE 110 may perform beam measurement (e.g., measuring SSB/TRS/CSI-RS/assistance RS/TCI-state) based on the configured beam (step S1020). Specifically, the beam may be configured in the CG configuration (e.g., via SSB set). In one embodiment, the beam measurement may be a L1-RSRP measurement. In one embodiment, the beam may be configured in a configuration for SDT. In one embodiment, a UE may be configured with a RS resource list (e.g., SSB set) which is used for beam measurement (for CG-based SDT). However, after the UE receives the configuration of beam or the configuration of CG, in one embodiment, the UE may need to determine "when" to perform the measurement. In one embodiment, the UE may perform beam measurement based on one or more or combination of the following conditions:

In one embodiment, UE may perform beam measurement when/after receiving the RRC release (with suspendconfig IE) message and/or when the UE enters RRC_INACTIVE.

In one embodiment, UE may perform beam measurement when/after receiving the CG configuration and/or the beam configuration (associated with CG). For example, when/after receiving the CG configuration and/or the beam configuration (associated with CG), Layer 1 (e.g., PHY layer of UE) may assess the radio link quality (according to the set of configured beams/RSs, e.g., for CG-based SDT) and/or provide to higher layers (e.g., MAC layer of UE) a corresponding set of RSRP measurements (for the configured beam).

In one embodiment, UE may perform beam measurement when/after initiating a procedure for SDT (e.g., for CG-based) and/or when the procedure for SDT is running.

For example, when/after initiating a procedure for SDT (e.g., for CG-based) and/or when the procedure for SDT is running, Layer 1 (e.g., PHY layer of UE) may assess the radio link quality (according to the set of configured beams/RSs, e.g., for CG-based SDT) and/or provide to higher layers (e.g., MAC layer of UE) a corresponding set of RSRP measurements (for the configured beam).

In one embodiment, UE may perform beam measurement when/after determining that at least one CG configuration/resource is valid.

For example, when/after determining that at least one CG configuration/resource is valid, Layer 1 (e.g., PHY layer of UE) may assess the radio link quality (according to the set of configured beams/RSs, e.g., for CG-based SDT) and/or provide to higher layers (e.g., MAC layer of UE) a corresponding set of RSRP measurements (for the configured beam). The criterions for the determination of CG validity are depicted in this disclosure below.

In one embodiment, UE may perform beam measurement (only) for a specific beam(s) which is associated with a valid CG configuration/resource.

In one embodiment, UE may (only) measure a beam which is associated with valid CG configuration/resource. The UE may not measure a beam which is associated with an invalid CG configuration/resource. The UE may exclude a beam which is associated with an invalid CG configuration/resource for beam measurement.

In one embodiment, the valid CG configuration/resource is a CG which has not been released/suspended. The invalid CG configuration/resource is a CG which has been released/suspended.

For example, Layer 1 (e.g., PHY layer of UE) may assess the radio link quality (according to the set of configured beams/RSs, e.g., for CG-based SDT) and/or provide to higher layers (e.g., MAC layer of UE) a corresponding set of RSRP measurements for the configured beam which is with a valid CG configuration/resource.

In one embodiment, UE may perform beam measurement when/after at least one LCH/SRB/DRB which is configured for SDT having pending data.

In one embodiment, the LCH/SRB/DRB configured for SDT may not be suspended/released (or the LCH/SRB/DRB configured for SDT may be resumed) when UE transits from RRC_CONNECTED to RRC_INACTIVE after the RRC connection release procedure.

In one embodiment, the LCH/SRB/DRB configured for SDT may be configured by NW via dedicated RRC signaling, e.g., in the CG configuration.

For example, when/after at one LCH/SRB/DRB which is configured for SDT having pending data, Layer 1 (e.g., PHY layer of UE) may assess the radio link quality (according to the set of configured beams/RSs, e.g., for CG-based SDT) and/or provide to higher layers (e.g., MAC layer of UE) a corresponding set of RSRP measurements (for the configured beam).

In one embodiment, UE may perform beam measurement when/after at least a procedure for generating a MAC CE has been triggered (e.g., a BSR has been triggered, a PHR has been triggered, etc.).

For example, when/after at least a procedure for generating a MAC CE has been triggered (e.g., a BSR has been triggered, a PHR has been triggered, etc.), Layer 1 (e.g., PHY layer of UE) may assess the radio link quality (according to the set of configured beams/RSs, e.g., for CG-based SDT) and/or provide to higher layers (e.g., MAC layer of UE) a corresponding set of RSRP measurements (for the configured beam).

In one embodiment, UE may perform beam measurement prior to performing a UL transmission of SDT via CG.

Specifically, UE may perform beam measurement at/before a (pre)configured period before performing an UL transmission of SDT via CG. This period may consider the PUSCH preparation procedure time (e.g., subclause 6.4 of 3GPP TS 38.214). As such, the UE may have enough time to generate the TB/MAC PDU for transmission on the CG resource after determining that the measured beam quality is good (i.e., performing beam measurement).

For example, prior to performing a UL transmission of SDT via CG, Layer 1 (e.g., PHY layer of UE) may assess the radio link quality (according to the set of configured beams/RSs, e.g., for CG-based SDT) and/or provide to higher layers (e.g., MAC layer of the UE) a corresponding set of RSRP measurements (for the configured beam).

For example, at/before a (pre)configured period before performing a UL transmission of SDT via CG, Layer 1 (e.g., PHY layer of UE) may assess the radio link quality (according to the set of configured beams/RSs, e.g., for CG-based SDT) and/or provide to higher layers (e.g., MAC layer of UE) a corresponding set of RSRP measurements (for the configured beam).

In one embodiment, UE may perform beam measurement periodically (e.g., based on a periodicity IE configured by NW).

Specifically, for an example, the value of periodicity may be a fixed value preconfigured/predefined to the UE. For another example, the UE may receive the value of periodicity in the CG configuration, in the information element associated to the beam configuration (e.g., in the CG configuration), in RRC release message (including suspendconfiguration) and/or in RRC reconfiguration message. For another example, the value of periodicity may associate with the DRX cycle.

In one embodiment, the periodicity may be configured by an IE SSB periodicity and/or ssb-periodicityServingCell. If the IE is absent, UE may apply a default value (e.g., 5 ms).

For example, the UE may perform beam measurement during a duration every periodicity. The value of the duration may be less than the value of periodicity.

For example, Layer 1 (e.g., PHY layer of UE) may assess the radio link quality (according to the set of configured beams/RSs, e.g., for CG-based SDT) and/or provide to higher layers (e.g., MAC layer of UE) a corresponding set of RSRP measurements (for the configured beam) periodically.

For example, the UE may perform beam measurement when the UE monitors the paging occasions. For example, the UE may perform beam measurement when the UE is in on-duration within the DRX cycle. In one embodiment, the UE may perform beam measurement based on a timer.

In one embodiment, the UE may receive the value of timer in the CG configuration, in the information element associated to the beam configuration (e.g., in the CG configuration), in RRC release message (including suspendconfiguration) and/or in RRC reconfiguration message.

In one embodiment, the UE may (re-start) the timer when/after the UE performs a beam measurement and/or a beam selection. While the timer is running, the UE may not perform the beam measurement and/or the beam selection. When/After the timer expires, the UE may perform the beam measurement and/or beam selection.

For example, when/after the timer expires, Layer 1 (e.g., PHY layer of the UE) may assess the radio link quality (according to the set of configured beams/RSs, e.g., for CG-based SDT) and/or provide to higher layers (e.g., MAC layer of UE) a corresponding set of RSRP measurements (for the configured beam) periodically.

More specifically, the UE behavior of beam measurement may imply that UE measures the configured (set/list of) beams and/or the higher layers (e.g., MAC layer) of the UE may request Layer 1 (e.g., PHY layer) of the UE to provide the beam index(es) from the configured (set/list of) beams and the corresponding L1-RSRP measurements that are larger than or equal a configured RSRP threshold (e.g., rsrp-ThresholdSSB).

Beam Selection

Referring FIG. 10, during the procedure and/or after receiving the CG configuration and/or after performing beam measurement, the UE 110 may perform beam selection (step S1030), e.g., select a SSB (e.g., based on a RSRP threshold for the selection of the SSB for CG). Specifically, the UE 110 may determine if at least one of the SSBs with SS-RSRP above the RSRP threshold (among the SSBs in the SSB list).

In one embodiment, if at least one of the beams (e.g., SSB) with RSRP (e.g., SS-RSRP) above the RSRP threshold (among the beams in the configured beam list), UE may select one of the beams (for SDT).

In one embodiment, UE may select any of the beams (e.g., SSB) with RSRP (e.g., SS-RSRP) above the RSRP threshold (among the beams in the configured beam list).

In one alternative, UE may select the beam with the highest measured RSRP (e.g., SS-RSRP).

In one alternative, UE may select the beam with the highest/lowest ID (e.g., SSB-ID).

In one alternative, UE may select a beam associated with a CG resource/occasion and/or associated with a HARQ process ID (e.g., based on HARQ process ID determination), wherein the HARQ process does not have data waiting for retransmission ((e.g., while a CG timer and/or a window/timer for the HARQ process is running).

In one embodiment, if none of the beams (e.g., SSB) with RSRP (e.g., SS-RSRP) above the RSRP threshold (among the beams in the configured beam list), UE may initiate an RA procedure for SDT.

In one embodiment, if none of the beams (e.g., SSB) with RSRP (e.g., SS-RSRP) above the RSRP threshold (among the beams in the configured beam list), UE may initiate a RRC resume request procedure.

In one embodiment, if none of the beams (e.g., SSB) with RSRP (e.g., SS-RSRP) above the RSRP threshold (among the beams in the configured beam list), UE may stop/cancel the procedure for CG-based SDT or consider the procedure for CG-based SDT is unsuccessful.

In one embodiment, UE may select a CG resource/occasion corresponding to the selected beam (e.g., SSB) having RSRP above RSRP threshold.

In one embodiment, the RSRP threshold used for comparing with RSRP of beam is configured by a CGconfiguration.

More specifically, when the UE determines if there is a SSB with SS-RSRP above rsrp-ThresholdSSB or a CSI-RS with CSI-RSRP above rsrp-ThresholdCSI-RS, the UE may use the latest unfiltered RSRP (e.g., L1-RSRP) measurement (which may be provided by Layer 1).

Alternatively, UE behavior of beam selection may imply that the higher layers (e.g., MAC layer) of the UE may request Layer 1 (e.g., PHY layer) of the UE to provide the beam index(es) from the configured (set/list of) beams and the corresponding L1-RSRP measurements that are larger than or equal a configured RSRP threshold (e.g., rsrp-ThresholdSSB) and/or the UE may select one of the beams which is provided from Layer 1 (e.g., PHY layer).

More specifically, the higher layer (e.g., MAC layer) of the UE may indicate the SSB index of the selected SSB to Layer 1 (e.g., PHY layer) of the UE in response to selecting the SSB with SS-RSRP above the RSRP threshold.

SDT

Referring FIG. 10, the UE 110 may perform SDT via a CG based on the selected SSB (step S1040), e.g., the UE 110 may transmit an UL data via a CG resource/occasion (e.g., on PUSCH) which is associated with the selected SSB.

In one embodiment, the transmission (e.g., SDT) is transmitted on a physical uplink control channel (PUSCH). For example, UE 110 may transmit an UL data via PUSCH.

In one embodiment, UE may select CG resource/occasion corresponding to a selected SSB used for the transmission, and perform the transmission on the selected CG resource/occasion.

In one embodiment, in a case that there is CG resource/occasion associated with the selected beam, UE may determine the next available CG resource/occasion corresponding to the selected beam. The UE may perform the SDT on the determined CG resource/occasion.

In one embodiment, in a case that there is no CG resource/occasion associated with the selected beam, UE may determine the next available CG resource/occasion corresponding to the SSB (e.g., from a RS list/SSB set configured in the CG configuration) which is quasi-collocated with the selected beam. The UE may perform the SDT on the determined CG resource/occasion.

In one embodiment, a MAC entity/UE may select a CG resource/occasion randomly with equal probability amongst the CG resource/occasions occurring simultaneously but on different subcarriers, corresponding to the selected beam.

In one embodiment, a MAC entity/UE may take into account the possible occurrence of measurement gaps and/or PRACH occasion when determining the next available CG resource/occasion corresponding to the selected beam.

PDCCH Monitoring

Referring to FIG. 10, after transmitting the UL data (e.g., small data in RRC_INACTIVE) and/or receiving DL data, in one embodiment, the UE 110 may (re)start a window/timer (e.g., configured in the CG configuration), e.g., at the first PDCCH occasion as specified in 3GPP TS 38.213 from the end of the UL data transmission. More specifically, the UE 110 may monitor a PDCCH (e.g., on a specific search space configured in the CG configuration) by a specific RNTI (e.g., C-RNTI/CS-RNTI) while the window/timer is running.

In one embodiment, for the monitoring of the PDCCH, UE may attempt to detect a specific DCI (e.g., DCI format 1_0) with CRC scrambled by a specific RNTI (e.g., C-RNTI/CS-RNTI) during the window/timer.

In one embodiment, the window/timer may be started or restarted at the first symbol of the earliest CORESET UE is configured to receive/monitor PDCCH for a specific search space set (e.g., Type1-PDCCH CSS set and/or Type 1A-PDCCH CSS set), that may be at least X (e.g., one) symbol (or a preconfigured offset), after the last symbol of a time occasion corresponding to the transmission of the UL data. The symbol duration and/or the offset may correspond to the SCS for the specific search space set. The length of the window/timer may be in number of symbol/slot/subframe/ms, based on the SCS for the specific search space set.

In one embodiment, the specific search space set for SDT may be configured by an IE sdt-CG-SearchSpace.

In one embodiment, a UE may be provided with a USS set by sdt-CG-SearchSpace, or a CSS set by sdt-SearchSpace, to monitor PDCCH for detection of DCI formats with CRC scrambled by C-RNTI or CS-RNTI for scheduling respective PUSCH transmissions or PDSCH receptions.

In one embodiment, if UE has not been provided with a SDT search space for Type1 A-PDCCH CSS set, the UE may monitor PDCCH candidates for DCI format 1_0 with CRC scrambled by the C-RNTI/CS-RNTI in the Type1-PDCCH CSS set.

In one embodiment, for the monitoring of the PDCCH, UE may assume the same DM-RS antenna port quasi co-location properties (as described in 3GPP TS 38.214) as for a beam (SSB/TRS/CSI-RS/assistance RS/TCI-state) the UE used for the association of CG (e.g., the association/mapping between beam and CG resource/occasion), e.g., regardless of whether or not the UE is provided with TCI-state for the CORESET where the UE receives the PDCCH with the specific DCI format.

In one embodiment, for the monitoring of the PDCCH and/or PDCCH reception, UE may assume the PDCCH has same demodulation reference signal (DM-RS) antenna port quasi co-location properties as for the selected SSB associated with the transmission.

In one embodiment, UE may assume that the DM-RS antenna port associated with the PDCCH receptions, the DM-RS antenna port associated with the PDSCH receptions, and the SS/PBCH block associated with the PUSCH transmission are quasi co-located with respect to average gain and quasi co-location 'typeA' or 'typeD' properties.

Alternatively, for the monitoring of the PDCCH, the UE may assume the same DM-RS antenna port quasi co-location properties as for a beam (SSB/TRS/CSI-RS/assistance RS/TCI-state) selected by the UE (used for the transmission of CG resource/occasion).

Alternatively, for the monitoring of the PDCCH, the UE may assume the same DM-RS antenna port quasi co-location properties as for a beam (SSB/TRS/CSI-RS/assistance RS/TCI-state) the UE used for monitoring the paging (e.g., DCI scrambled by P-RNTI), e.g., regardless of whether or not the UE is provided with TCI-state for the CORESET where the UE receives the PDCCH with the specific DCI format.

Referring to FIG. 10, in a case that the UE 110 receives a DL indication/response (while the window/timer is running) on the PDCCH (step S1050), the UE 110 may apply one or more of the followings:

In one embodiment, in a case that UE receives a DL indication/response (while the window/timer is running) on the PDCCH, the UE may consider the procedure (for SDT) is successfully completed and/or is unsuccessfully completed.

In one embodiment, in a case that UE receives a DL indication/response (while the window/timer is running) on the PDCCH, the UE may keep preforming the subsequent data transmission (e.g., keep monitoring PDCCH for C-RNTI/CS-RNTI) (step S1060).

In one embodiment, for the monitoring of the PDCCH (for receiving the DL indication/response and/or after receiving the DL indication/response), UE may assume the same DM-RS antenna port quasi co-location properties (as described in 3GPP TS 38.214) as for a beam (SSB/TRS/CSI-RS/assistance RS/TCI-state) indicated by the DL indication/response.

Alternatively, for the monitoring of the PDCCH (for receiving the DL indication/response and/or after receiving the DL indication/response), UE may assume the same DM-RS antenna port quasi co-location properties (as described in 3GPP TS 38.214) as for a beam (SSB/TRS/CSI-RS/assistance RS/TCI-state) the UE used for the association of CG (e.g., the association between SSB/beam and CG resource/occasion), e.g., if the DL indication/response does not indicate any beam information (e.g., TCI-state).

Alternatively, for the monitoring of the PDCCH (for receiving the DL indication/response and/or after receiving the DL indication/response), UE may assume the same DM-RS antenna port quasi co-location properties (as described in 3GPP TS 38.214) as for a beam (SSB/TRS/CSI-RS/assistance RS/TCI-state) selected by the UE (used for the transmission of CG resource/occasion), e.g., if the DL indication/response does not indicate any beam information (e.g., TCI-state).

In one embodiment, in a case that UE receives a DL indication/response (while the window/timer is running) on the PDCCH, the UE may use/activate/(re-)initiate the CG configuration/resource/occasion which is associated with the selected beam (for the subsequent data transmission)

In one embodiment, in a case that UE receives a DL indication/response (while the window/timer is running) on the PDCCH, the UE may start or stop beam measurements.

In one embodiment, in a case that UE receives a DL indication/response (while the window/timer is running) on the PDCCH, the UE may not select beam for the next CG resource/occasion In one embodiment, in a case that UE receives a DL indication/response (while the window/timer is running) on the PDCCH, the UE may release/suspend/discard/clear other CG resource/occasion(s) which are not associated with the selected beam More specifically, the DL indication/response may be an ACK and/or NACK.

In one embodiment, in a case that the UE does not receive the DL indication/response (while the window/timer is running) on the PDCCH, and/or if the DL indication/response indicates NACK, and/or if the window/timer expires, and/or if there is no CG resource/occasion associated with the selected beam, the UE may apply one or more of the following actions:

In one embodiment, UE may perform the CG resource/occasion selection and/or beam measurement/beam selection again (during the procedure). Specifically, the UE may select the same beam or another beam which has not been selected (during the procedure).

Specifically, the UE may determine the next available CG resource/occasion from the CG resource/occasions corresponding to the (new) selected beam.

In one embodiment, UE may perform the UL transmission (for SDT) via (another) CG configuration/resource/occasion based on (another) selected CG resource/occasion and/or beam.

Specifically, the UE may perform the UL transmission on the next available CG resource/occasion from the CG resource/occasions corresponding to the (new) selected beam.

In one embodiment, UE may increment a counter by 1. Specifically, the counter may be used to count the number of UL transmission/Beam selection via CG (for the procedure of CG-based SDT). Alternatively, the counter may be used for power ramping. Specifically, the counter may be used for UL skipping.

In one embodiment, the UE may (only) perform one or more of the following actions when the counter for CG-based SDT reaches to a maximum value:

In one alternative, when the counter for CG-based SDT reaches to a maximum value, the UE may stop/cancel the procedure for CG-based SDT and/or consider the procedure for CG-based SDT is unsuccessful.

In one alternative, when the counter for CG-based SDT reaches to a maximum value, the UE may initiate a RA procedure (for SDT). For example, UE may transmit a specific preamble on a specific PRACH occasion. The specific preamble and/or the specific PRACH occasion may be configured for SDT.

In one embodiment, for a CORESET (e.g., other than a CORESET with index 0), if a UE has not been provided with a configuration of TCI state(s) (e.g., by tci-StatesPDCCH-ToAddList and tci-StatesPDCCH-ToReleaseList for the CORESET), or has been provided with initial configuration of more than one TCI states for the CORESET (e.g., by tci-StatesPDCCH-ToAddList and tci-StatesPDCCH-ToReleaseList) but has not received a MAC CE activation command for one of the TCI states as described in 3GPP TS 38.321] the UE may assume that the DM-RS antenna port associated with PDCCH receptions is quasi co-located with the beam (e.g., SS/PBCH block) the UE identified/selected/determined during the (CG/RA) procedure for SDT.

CG Resource Overhead Reduction

For CG-based SDT, UE may be configured with a SSB resource list (e.g., via SSB set), a CG configuration, and/or the association/mapping between SSBs and CG resources/occasion of the CG configuration. In multi-beam system, it can be seen that multiple SSBs may be configured to the UE, e.g., for beam measurement and/or beam selection. For example, assuming that one SSB is associated with one CG resource/occasion, and the UE is configured with four SSBs. There are four CG resource/occasion should be configured for the mapping of four SSBs. However, for data transmission, the UE may only select one SSB (e.g., with the better RSRP). In other words, the UE may only use one of four CG resource/occasion to perform UL data transmission at one transmission, and the other CG resource/occasion are not used. Since the CG resource for SDT may be a dedicated resource, i.e., the CG resource can only be used by a UE which is configured with that CG resource, it is inefficient to maintain/reserve/store so many CG resources for a long time if it is not used. In this disclosure, it may provide some methods to improve the efficiency of CG resource usage.

In some embodiments, UE may release/suspend/discard/clear some or all of the configured CG resource(s)/UL grant.

In one embodiment, a UE may be configured with multiple SSB resources (e.g., via a SSB set, a CG configuration (including multiple CG resources/occasion), and/or the association/mapping between SSBs and CG resources/occasion. The UE may perform SSB measurements based on the configured SSB resources (e.g., when the UE is in RRC_INACTIVE). The UE may select a SSB (e.g., with SS-RSRP above a threshold), e.g., before determining (an available) CG resource/occasion for UL data transmission. The UE may select a first SSB and may transmit the UL data via a first CG resource/occasion which is associated with the first SSB. After the UE selecting the SSB and/or the corresponding CG resource/occasion, the UE may release/suspend/discard/clear other CG resource/occasion. In one embodiment, the other CG resource/occasion may not be the first CG resource/occasion. In one embodiment, the other CG resource/occasion may not associate with the first SSB. In one embodiment, UE may not release/suspend/discard/clear the first CG resource/occasion. In one embodiment, UE may store/maintain/reserve the first CG resource/occasion. In one embodiment, UE may or may not perform the measurement for the SSB/RS which is associated with a CG, wherein the CG has been released/suspended/discarded/cleared. In one embodiment, UE may or may not select a SSB which is not associated with any CG. In one embodiment, the UE may or may only select a SSB which is configured to be associated with at least one CG resource/occasion (and the CG resource has not been released/suspended/discarded/cleared).

In one embodiment, the UE may release/suspend/discard/clear other CG resource/occasion (at a specific timing).

In one embodiment, UE may release/suspend/discard/clear other CG resource/occasion when/after the UE selects a SSB (for CG resource/occasion).

In one embodiment, UE may only release/suspend/discard/clear other CG resource/occasion if the RSRP of the selected SSB is above a threshold.

In one embodiment, UE may not release/suspend/discard/clear other CG resource/occasion if the RSRP of the selected SSB is not above a threshold.

In one embodiment, UE may release/suspend/discard/clear other CG resource/occasion when/after receiving an indication (for a UL transmission via the first CG resource/occasion) from NW.

In one embodiment, the indication may be a feedback (e.g., ACK) for a UL transmission via the first CG resource/ occasion. Specifically, the first CG resource/occasion is associated with the selected SSB.

In one embodiment, the indication may be a (DL) response for a UL transmission via the first CG resource/occasion. Specifically, the first CG resource/occasion is associated with the selected SSB.

In one embodiment, the indication may be a DL signaling. In one example, a RRCRelease message (with suspendConfig IE) in response to the transmission of a UL RRC message on the first CG resource/occasion. Specifically, the UL RRC message transmitted on the first CG resource may be a RRCResumeRequest message. In one example the DL signaling may indicate the CG (associated with a beam) is no valid (or no longer supported).

In one embodiment, the indication may be indicated via SI, RRC release (with suspendConfig) message, RRC reconfiguration, and/or DCI.

In one embodiment, UE may release/suspend/discard/clear other CG resource/occasion when/after a specific period of time.

In one embodiment, UE may be configured with a value for the period of time.

In one embodiment, UE may (re-)start a window/timer when transmitting an UL data via a CG after selecting a SSB. The UE may monitor PDCCH while the window/timer is running. If the window/timer expires, the UE may release/suspend/discard/clear other CG resource/occasion. If the window/timer expires, and the UE does not receive a DL response from the NW, the UE may release/suspend/discard/clear other CG resource/occasion. If the UE receives a DL response from NW before the window/time expires as shown in step S1050 of FIG. 10, the UE may perform a subsequent data transmission (step S1060).

In one embodiment, UE may release/suspend/discard/clear other CG resource/occasion when/after transmitting a report (successfully) to NW.

In one embodiment, UE may release/suspend/discard/clear other CG resource/occasion when/after receiving a feedback/response, from NW, for the transmission of a report.

In one embodiment, the report may be a beam measurement report.

In one embodiment, the report may indicate the (selected) (one or more) SSB (index).

In one embodiment, the report may include a field to indicate the presence of the SSB index field. For example, if at least one of the SSBs with SS-RSRP above a threshold among the SSBs in the configured SSB resource list (e.g., include CG-SSB-resource), the field may be set to a first value (e.g., 1); otherwise, it may be set to a second value (e.g., 0).

In one embodiment, the report may include a field set to the index of a SSB with SS-RSRP above rsrp-ThresholdBFR (amongst the SSBs in the configured SSB resource list (e.g., include CG-SSB-resource)).

In one embodiment, the report may indicate the SSB index and its measurement result (e.g., the value of RSRP).

In one embodiment, the report may be transmitted via RRC signaling/MAC CE/PHY signaling.

In one embodiment, the report may be transmitted via the first CG resource/occasion.

In one embodiment, the report may be used to inform the NW which SSB is qualified, then the NW may transmit the DL singling to the UE based on this SSB.

In one embodiment, UE may trigger/generate/transmit the report to NW in some embodiments.

In one embodiment, UE may trigger/generate/transmit the report to NW on each UL transmission via CG.

In one embodiment, UE may trigger/generate/transmit the report to NW when/after selecting a SSB (for CG resource/occasion).

In one embodiment, UE may trigger/generate/transmit the report to NW when/after the selected SSB is changed (i.e., a change of selected SSB). For example, the UE may select a first SSB and perform the UL transmission via a first CG resource/occasion at first. After that, the UE may select a second SSB and perform the UL transmission via the second CG resource/occasion. The UE may need to trigger the report when/after the UE selects the second SSB. The UE may need to transmit the report to NW via the second CG resource/occasion. If the second SSB is the same as the first SSB, the UE may not need to trigger/generate/transmit the report to NW.

In one embodiment, UE may trigger/generate/transmit the report to NW when/after the RSRP of the selected SSB is lower than a threshold.

In one embodiment, UE may trigger/generate/transmit the report to NW once for a number of UL transmission via CG. For example, the UE may use a counter to control triggering/generation/transmission of the report.

In one example, UE may count how many times it skips the UL transmission (via the CG). When the value of the counter reaches to a pre-configured maximum value, the UE may trigger/generate/transmit the report to NW.

In one example, UE may count how many times it has performed the UL transmission (via the CG). When the value of the counter reaches to a pre-configured maximum value, the UE may trigger/generate/transmit the report to NW.

In one example, UE may count how many times it fails to transmit an UL data (via the CG), e.g., the UE does not receive the feedback/response from NW or the UE receives the NACK from NW. When the value of the counter reaches to a pre-configured maximum value, the UE may trigger/generate/transmit the report to NW.

In one example, UE may count how many times it fails to find/select a qualified beam that associates to a specific CG resource.

In one embodiment, UE may trigger/generate/transmit the report to NW periodically. For example, a UE may be configured with a timer to control the triggering/generation/transmission of the report. The timer may only be used when the UE is in RRC_INACTIVE. The timer may be configured in the CG configuration.

In one embodiment, UE may (re-)start the timer when/after the UE trigger/generate/transmit the report to NW.

In one embodiment, UE may (re-)start the timer when at least one of the following conditions is satisfied.

The UE performs transmission (successfully) on a CG resource (corresponding to the CG configuration).

The UE receives an indication in response to the transmission on a CG resource (corresponding to the CG configuration).

The indication may be ACK/NACK.

The indication may be a DL response (e.g., RRC message such as RRCRelease message).

The UE may trigger/generate/transmit the report to NW upon the timer expiry.

In one embodiment, UE may (re-)start a prohibit timer when/after triggering/generating/transmitting the report to NW. For example, while the prohibit timer is running, the UE could not trigger/transmit/generate/another report.

In one embodiment, UE may trigger/generate/transmit the report when/after receiving an indication from NW (to trigger the report).

In some embodiments, UE may release/suspend/discard/clear a specific CG resource/occasion which is associated with a specific SSB based on some criterions. The specific CG resource/occasion may be one of the CG resources/occasion of a CG configuration. To release/suspend/discard/clear a specific CG resource/occasion may imply that the UE would maintain/reserve/store other CG resources/occasion (which are not the specific CG resource/occasion).

In one embodiment, UE may release/suspend/discard/clear the specific CG resource/occasion when/after the specific SSB is not qualified. Specifically, when the specific SSB is not qualified (e.g., the RSRP of the specific SSB is lower than a threshold), the lower layer (e.g., PHY layer) of the UE may indicate an indication to the higher layer (e.g., MAC layer) of the UE.

In one example, the UE may measure the specific SSB, and derive the RSRP of the specific SSB. If the RSRP of the specific SSB is lower than a threshold (and/or the indication has been received from lower layer), the UE may release/suspend/discard/clear the specific CG resource/occasion.

In one example, the UE may measure the specific SSB, and derive the RSRP of the specific SSB. If the RSRP of the specific SSB is lower than a threshold (and/or the indication has been received from lower layer) for a period of time, the UE may release/suspend/discard/clear the specific CG resource/occasion. The period of time may be controlled by a timer. The timer may be (re)started when the RSRP of the specific SSB is not lower than (or is above) the threshold (and/or the indication has not been received from lower layer). Upon the timer expiry, the UE may release/suspend/discard/clear the specific CG resource/occasion. The UE may receive the value of the timer together with the CG configuration. Alternatively, the value of the timer may be preconfigured or predefined to the UE.

In one example, the UE may measure the specific SSB, and derive the RSRP of the specific SSB. If the RSRP of the specific SSB is lower than a threshold (and/or the indication has been received from lower layer), the UE may increment a value of a specific counter by 1. The specific counter may be associated with the specific SSB and/or the specific CG resource/occasion. If the value of the specific counter reaches to a maximum value, the UE may release/suspend/discard/clear the specific CG resource/occasion.

In one embodiment, the specific counter and/or the maximum value for the specific counter may be configured in CG configuration.

In one embodiment, the specific counter may be reset when a specific timer expires. The specific timer and/or the value for the specific timer may be configured in CG configuration. The specific timer may be (re-)started when the RSRP of the specific SSB is lower than a threshold (and/or the indication has been received from lower layer).

In one embodiment, the specific counter may be reset when the CG resource/configuration is considered invalid.

In one embodiment, UE may release/suspend/discard/clear a specific CG resource/occasion when/after the UE (fails to) transmit the UL data via the specific CG resource/occasion for a number of times.

In one example, a (transmission) counter may be used to count how many times the UE (fails to) transmit the UL data via the specific CG resource/occasion. The UE may determine this UL data transmission is (failed to) transmit based on whether the UE receives the feedback (e.g., ACK/NACK) for the HARQ process that used to transmit the UL data from the NW. If the UE does not receive the feedback (e.g., ACK) from the NW, the UE may increment the (transmission) counter by 1. If the UE receives the feedback (e.g., NACK) from the NW, the UE may increment the (transmission) counter by 1. In a case that the value of the counter reaches to a maximum number, the UE may release/suspend/discard/clear a specific CG resource/occasion.

In one embodiment, the (transmission) counter and/or the maximum value for the counter may be configured in CG configuration.

In one embodiment, the (transmission) counter may be associated with the specific CG resource/occasion and/or the specific SSB.

In one embodiment, the (transmission) counter may be reset when the UE successfully performs an UL transmission. For example, the UE receives a feedback/response (e.g., ACK) from the NW.

In one embodiment, the (transmission) counter may be reset when the CG resource/configuration is considered invalid.

In one embodiment, UE may release/suspend/discard/clear a specific CG resource/occasion when/after the UE skips (or not generate a MAC PDU/TB) the UL transmission(s) (for a HARQ process) via the specific CG resource/occasion for a number of times.

In one example, a (UL skipping) counter may be used to count how many times the UE skips (or not generate a MAC PDU/TB) the UL transmission(s) (for a HARQ process) via the specific CG resource/occasion. The UE may determine this UL data transmission is skipped (or not generate a MAC PDU/TB) (for a HARQ process) based on one or more of the following rules:

When the beam which associated with the CG resource is not qualified.

When there is no beam is qualified. For example, the UE determines that none of (configured) beam's RSRP is above a threshold.

When the UE is configured with a parameter for UL skipping with value true. The UE may receive the parameter for UL skipping together with CG configuration.

When the grant indicated to a HARQ entity was addressed to a C-RNTI or the grant indicated to the HARQ entity is a configured uplink grant When there is no aperiodic CSI requested for this PUSCH transmission as specified in 3GPP TS 38.212

When the MAC PDU/TB includes zero MAC SDUs

When the MAC PDU/TB includes only the periodic BSR and there is no data available for any LCG, or the MAC PDU includes only the padding BSR.

In one embodiment, if UE skips the UL transmission (or not generate a MAC PDU/TB) (for a HARQ process) via the specific CG resource/occasion, the UE may increment the (UL skipping) counter by 1. In a case that the value of the (UL skipping) counter reaches to a maximum number, the UE may release/suspend/discard/clear a specific CG resource/occasion.

In one embodiment, the (UL skipping) counter and/or the maximum value for the counter may be configured in CG configuration.

In one embodiment, the (UL skipping) counter may be associated with the specific CG resource/occasion and/or the specific SSB.

In one embodiment, the (UL skipping) counter may be reset when the CG resource/configuration is considered invalid In one embodiment, UE may release/suspend/discard/clear a specific CG resource/occasion if the UE does not select a specific SSB for a period of time (or a number of times).

In one example, when UE selects a specific SSB (e.g., for the specific CG transmission), the UE may (re-)start a timer (for the specific SSB and/or the specific CG). Upon the timer expires, the UE may release/suspend/discard/clear a specific CG resource/occasion. The UE may be configured with the value of the timer together with CG configuration. Alternatively, the value of the timer may be preconfigured or predefined to the UE.

In one embodiment, UE may inform an information to let NW know it has released/suspended/discarded/cleared a specific CG resource/occasion.

In one example, the UE may trigger a specific report and/or indicate a specific indication to NW if the UE releases/suspends/discards/clears a specific CG resource/occasion.

In one embodiment, the specific report and/or the specific indication may include an information of SSB (e.g., SSB index) and/or CG (e.g., CG index).

In one embodiment, the specific report and/or the specific indication may be transmitted via an UL grant provided by dynamic grant, CG, Msg3, and/or MsgA.

NUL and SUL

In one embodiment, SUL (Supplementary UL) is provided. In conjunction with a UL/DL carrier pair (FDD band) or a bidirectional carrier (TDD band), a UE may be configured with additional, Supplementary Uplink (SUL). SUL differs from the aggregated uplink in that the UE may be scheduled to transmit either on the supplementary uplink or on the uplink of the carrier being supplemented, but not on both at the same time.

In one embodiment, there can be two UL carriers (NUL and SUL) configured for a serving cell. The two carriers may have different characteristics (e.g., different frequency bands FR1/FR2). Since payload size of a CG-based SDT PUSCH resource might be larger, it may be beneficial to also support the configuration of CG-SDT resources on the SUL carrier. For example, it is possible to configure CG resources for SDT separately for NUL and SUL, i.e., RRC Release/RRC reconfiguration message may provide CG-SDT resource for both NUL and SUL.

In some embodiments, the UE may select one of NUL and SUL carrier for performing the CG-based SDT, e.g., when a procedure for CG-based SDT is initiated. The UE may select one of NUL and SUL carrier based on a RSRP threshold. For example, if the RSRP of the DL pathloss reference is less than a threshold (for SUL), the UE may select the SUL carrier; otherwise, the UE may select the NUL carrier. If the UE selects the NUL carrier, the UE may use the CG configuration/resource configured for the NUL carrier to perform SDT. If the UE selects the SUL carrier, the UE may use the CG configuration/resource configured for the SUL carrier to perform SDT.

In some embodiments, the UE may be indicated (from NW) to switch to one of NUL and SUL carrier for performing the CG-based SDT, e.g., when a procedure for CG-based SDT is initiated. The UE may select one of NUL and SUL carrier based on the indication from NW. The indication may be transmitted via SI, RRC release (with suspendconfi) message, RRC reconfiguration message, and/or DCI. The indication may be a feedback (e.g., ACK/NACK) from NW.

In some embodiments, a first CG configuration/resource may be configured for the NUL carrier, and a second CG configuration/resource may be configured for the SUL carrier. The UE may release/suspend/discard/clear the first CG configuration/resource, the second CG configuration/resource, and/or both based on some criterions:

In one embodiment, UE may release/suspend/discard/clear the first CG configuration/resource if the UE selects SUL carrier (for performing the CG-based SDT). More specifically, the UE may not release/suspend/discard/clear the second CG configuration/resource if the UE selects SUL carrier (for performing the CG-based SDT).

In one embodiment, UE may release/suspend/discard/clear the second CG configuration/resource if the UE selects NUL carrier (for performing the CG-based SDT). More specifically, the UE may not release/suspend/discard/clear the first CG configuration/resource if the UE selects NUL carrier (for performing the CG-based SDT).

More specifically, the UE may set the PCMAX to $P_{CMAX, f,c}$ of the NUL carrier if the UE selects the NUL carrier (for performing the CG-based SDT).

More specifically, the UE may set the PCMAX to $P_{CMAX, f,c}$ of the SUL carrier if the UE selects the SUL carrier (for performing the CG-based SDT).

Beam Failure Detection for SDT

It is noted that a UE may be configured with multiple beams (e.g., SSB/TRS/CSI-RS/assistance RS/TCI-state), e.g., via a set or a list, for the UE to determine/select the beam for SDT (e.g., during the SDT procedure). The UE may select the beam based on beam measurement (e.g., L1-RSRP measurements). The selected beam may be associated with a specific CG resource/occasion. The UE may transmit the UL data (e.g., small data) via the specific CG resource/occasion (which is associated with the selected beam), e.g., while the UE is in RRC_INACTIVE.

In one embodiment, a UE may be provided with a set/list of (periodic) beams (e.g., SSB/TRS/CSI-RS/assistance RS/TCI-state). In one embodiment, the set/list of (periodic) beams may be used for failure detection (e.g., for the UE in RRC_INACTIVE). In one embodiment, the beams may be configured in the CG configuration (for SDT). In one embodiment, the beams may be indicated for the association between CG resource/occasion. In one embodiment, UE may determine the set/list of beams to include periodic RS resource configuration indexes with the same values as the RS indexes in the RS sets indicated by CG configuration and/or by RRC release message, and/or by TCI-State for respective CORESETs that the UE uses for monitoring PDCCH, e.g., if a UE is not provided with a set/list of (period) beams.

In one embodiment, a UE may assess the radio quality based on the configured set/list of beams. Specifically, Layer 1 (e.g., PHY layer of the UE) may assess the radio link quality (according to the set of configured beams, e.g., for CG-based SDT). Specifically, a UE may be configured with a (RSRP) threshold for determining whether the radio link is qualified.

In one embodiment, Layer 1 (e.g., PHY layer of UE) may provide to higher layers (e.g., MAC layer of the UE) a corresponding set of RSRP measurements (for the configured beam) and/or provide an indication to higher layers (e.g., MAC layer of the UE), e.g., in a case that the radio link quality is worse than the configured (RSRP) threshold. Specifically, the Layer 1 (e.g., PHY layer of the UE) may provide the indication to higher layers (e.g., MAC layer of the UE) when the radio link quality is worse than the configured threshold with a periodicity.

In one embodiment, all the configured beams (for SDT) are determined as not qualified, which may be denoted as beam failure for SDT in this disclosure. In this case, if UE selects one of the beams which is not qualified to perform the UL transmission via CG, the UE may fail to receive the DL response from the NW since the radio quality is not qualified. Therefore, the UE may need to perform some procedures to detect whether the beam failure for SDT occurs and/or to perform some actions if beam failure (or none of the beams is qualified) for SDT happens.

UE Behaviors upon None of the Beams is Qualified

In one embodiment, UE may perform one or more of the following embodiments if the UE could not select any beam to perform SDT via CG, e.g., If none of the beams (e.g., SSB) with RSRP (e.g., SS-RSRP) above the RSRP threshold (among the beams in the configured beam list):

In one embodiment, if UE could not select any beam to perform SDT via CG, e.g., if none of the beams (e.g., SSB) with RSRP (e.g., SS-RSRP) above the RSRP threshold (among the beams in the configured beam list), the UE may select any beam. In one embodiment, the UE may select a beam which is selected last time. In one embodiment, the UE may select a beam which is used for monitoring PDCCH (last time). In one embodiment, the UE may select a beam which is indicated by the NW (e.g., based on TCI-state). In one embodiment, the UE may select a beam which has the highest radio quality (e.g., SS-RSRP, SS-RSRQ) among all beams. In one embodiment, the UE may select a beam with the highest/lowest ID (e.g., SSB-ID).

In one embodiment, if UE could not select any beam to perform SDT via CG, e.g., if none of the beams (e.g., SSB) with RSRP (e.g., SS-RSRP) above the RSRP threshold (among the beams in the configured beam list), the UE may select a default beam. In one embodiment, the default beam may be the lowest/highest index of the configured beam. In one embodiment, the default beam may be a pre-configured beam with a specific index. In one embodiment, the default beam may be a beam with the best quality (e.g., the highest RSRP measurement).

In one embodiment, if UE could not select any beam to perform SDT via CG, e.g., if none of the beams (e.g., SSB) with RSRP (e.g., SS-RSRP) above the RSRP threshold (among the beams in the configured beam list), the UE may skip the SDT via CG. Specifically, the UE may skip the SDT for a period of time (e.g., based on a timer and/or a back-off value). The UE may perform the beam selection and/or the CG resource selection again after the timer expires and/or after the back-off time.

In one embodiment, if UE could not select any beam to perform SDT via CG, e.g., If none of the beams (e.g., SSB) with RSRP (e.g., SS-RSRP) above the RSRP threshold (among the beams in the configured beam list), the UE may consider the CG configuration/recourse is not valid.

In one embodiment, if UE could not select any beam to perform SDT via CG, e.g., If none of the beams (e.g., SSB) with RSRP (e.g., SS-RSRP) above the RSRP threshold (among the beams in the configured beam list), the UE may consider a Timer (e.g., TAT timer or a beam valid timer) as expiry and/or stop and/or release the Timer.

In one embodiment, UE may receive the value of timer in the CG configuration, in the information element associated to the beam configuration (e.g., in the CG configuration), in RRC release message (including suspendconfiguration) and/ or in RRC reconfiguration message.

In one example, the timer may be a TA timer. For example, the UE may consider the TA is valid while the TA timer is running. The UE may consider the TA is not valid while the TA timer is not running.

In one example, the timer may be a window/timer for monitoring PDCCH. For example, after transmitting the UL data (e.g., small data in RRC_INACTIVE), the UE may (re)start a window/timer (e.g., configured in the CG configuration), e.g., at the first PDCCH occasion as specified in 3GPP TS 38.213 from the end of the UL data transmission. More specifically, the UE may monitor a PDCCH (e.g., on a specific search space configured in the CG configuration) by a specific RNTI (e.g., C-RNTI/CS-RNTI) while the window/timer is running.

In one example, the timer may be a beam-related timer. For example, the UE may (re-start) the timer when/after the UE performs a beam measurement and/or a beam selection. While the timer is running, the UE may not perform the beam measurement and/or the beam selection. When/After the timer expires, the UE may perform the beam measurement and/or beam selection.

In one embodiment, if UE could not select any beam to perform SDT via CG, e.g., if none of the beams (e.g., SSB) with RSRP (e.g., SS-RSRP) above the RSRP threshold (among the beams in the configured beam list), the UE may release/clear/suspend/store (all) the CG configuration/resource/occasion (for SDT).

In one embodiment, if UE could not select any beam to perform SDT via CG, e.g., if none of the beams (e.g., SSB) with RSRP (e.g., SS-RSRP) above the RSRP threshold (among the beams in the configured beam list), the UE may initiate a RA procedure (for SDT).

In one embodiment, if UE could not select any beam to perform SDT via CG, e.g., If none of the beams (e.g., SSB) with RSRP (e.g., SS-RSRP) above the RSRP threshold (among the beams in the configured beam list), the UE may initiate a RRC (connection) resume procedure.

In one example, if UE could not select any beam to perform SDT via CG, e.g., If none of the beams (e.g., SSB) with RSRP (e.g., SS-RSRP) above the RSRP threshold (among the beams in the configured beam list), the UE may initiate transmission of the RRCResumeRequest message or RRCResumeRequest1 in accordance with 5.3.13.3 of 3GPP TS 38.331.

In one embodiment, if UE could not select any beam to perform SDT via CG, e.g., If none of the beams (e.g., SSB) with RSRP (e.g., SS-RSRP) above the RSRP threshold (among the beams in the configured beam list), the UE may trigger/generate/transmit an information/report to indicate this situation (e.g., beam failure and/or none of the beam is qualified) to NW. More specifically, the information/report may be used to indicate the NW that the corresponding CG configuration/resource is released/suspended/deactivated by the UE. Alternatively, the UE may trigger/initiate a RA procedure if the UE triggers this information/report. More specifically, the information/report may be transmitted via Msg3 and/or MsgA. Alternatively, the information/report may be transmitted via RRC signaling, MAC CE, and/or PHY signaling.

In one embodiment, if UE could not select any beam to perform SDT via CG, e.g., if none of the beams (e.g., SSB) with RSRP (e.g., SS-RSRP) above the RSRP threshold (among the beams in the configured beam list), the UE may ramp the power (in dB) to perform the SDT. How much power (dB) to ramp may be based on a preconfigured parameter (e.g., in CG configuration and/or RRC release message). For example, the preconfigured parameter may be a powerRampingStep.

In one embodiment, if UE could not select any beam to perform SDT via CG, e.g., if none of the beams (e.g., SSB) with RSRP (e.g., SS-RSRP) above the RSRP threshold (among the beams in the configured beam list), the UE may initiate/perform a cell reselection procedure. For example, the UE may keep in RRC_INACTIVE and perform cell reselection. For another example, the UE may enter RRC_IDLE and perform cell reselection.

Beam Failure Detection for SDT

In one embodiment, UE may perform a procedure to detect beam failure for SDT (e.g., CG-based SDT) based on one or more of the following embodiments.

In one embodiment, UE may determine whether beam failure for SDT is detected by counting a specific instance indication from the lower layer (e.g., PHY layer) of the UE to higher layer (e.g., MAC entity) of the UE.

In one embodiment, the specific instance indication may be provided by lower layer when the radio link quality for all corresponding resource configurations in the set/list of configured beams that the UE uses to assess the radio link quality is worse than the preconfigured threshold. In one embodiment, the set/list of (periodic) beams may be used for failure detection (e.g., for the UE in RRC_INACTIVE). In one embodiment, the beams may be configured in the CG configuration (for SDT). In one embodiment, the beams may be indicated for the association between CG resource/occasion. In one embodiment, the UE may determine the set/list of beams to include periodic RS resource configuration indexes with the same values as the RS indexes in the RS sets indicated by CG configuration and/or by RRC release message, and/or by TCI-State for respective CORE-SETs that the UE uses for monitoring PDCCH, e.g., if a UE is not provided with a set/list of (period) beams.

In one embodiment, UE (e.g., MAC entity) may maintain a counter to count the number of the specific indication received from the lower layer. More specifically, the counter may be configured per CG configuration and/or per CG resource. The counter may be initially set to 0. The value of the counter may be incremented (by 1) when the specific instance indication is received, e.g., from lower layer. In one embodiment, a UE may assess the radio quality based on the configured set/list of beams. In one embodiment, Layer 1 (e.g., PHY layer of the UE) may assess the radio link quality (according to the set of configured beams, e.g., for CG-based SDT). In one embodiment, a UE may be configured with a (RSRP) threshold for determining whether the radio link is qualified. In one embodiment, Layer 1 (e.g., PHY layer of the UE) may provide to higher layers (e.g., MAC layer of the UE) a corresponding set of RSRP measurements (for the configured beam) and/or provide an indication to higher layers (e.g., MAC layer of the UE), e.g., in a case that the radio link quality is worse than the configured (RSRP) threshold. In one embodiment, the Layer 1 (e.g., PHY layer of the UE) may provide the indication to higher layers (e.g., MAC layer of the UE) when the radio link quality is worse than the configured threshold with a periodicity.

In one embodiment, UE may determine beam failure for SDT is detected if the number of the counter reaches to the maximum value. The UE may be configured with a maximum value for the counter.

In one embodiment, the counter may be reset when one or more of the following criterions are satisfied:

In one embodiment, the counter may be reset when a specific timer expires. The specific timer may be (re-)started when the specific instance indication is received, e.g., from lower layer.

In one embodiment, the counter may be reset when UE successfully transmits the UL data (via the CG)

In one embodiment, the counter may be reset when UE receives a DL response (e.g., ACK/NACK) from the NW. The DL response may be a PDCCH addressed to a specific RNTI (e.g., C-RNTI/CS-RNTI). The DL response may be received within a time period of a window/timer. The window/timer may be (re-)started (an offset) after the UL transmission via the CG.

In one embodiment, the counter may be reset when the UE enters RRC_CONNECTED and/or RRC_IDLE In one embodiment, the counter may be reset when the corresponding CG configuration/resource is released/suspended/cleared and/or the corresponding CG configuration/resource is considered as invalid.

In one embodiment, the counter may be reset when the (CG-based and/or RA based) procedure of SDT is stopped/canceled and/or when the (CG-based and/or RA based) procedure of SDT is initialized. In one embodiment, UE may determine whether beam failure for SDT is detected by counting the number that the UE fails to perform the UL transmission via a CG resource.

In one embodiment, UE may maintain a counter to count the number that the UE fails to perform the UL transmission via a CG resource. More specifically, the counter may be configured per CG configuration and/or per CG resource. The counter may be initially set to 0.

In one embodiment, UE may increment the counter (by 1) if the UE fails to perform the UL transmission via a CG resource and/or any CG resource of a CG configuration.

In one embodiment, UE may increment the counter (by 1) if the UE perform a UL transmission via a CG resource and/or any CG resource of a CG configuration but the UE could not receive a DL response from NW for the CG resource, e.g., within a time period of a window/timer. The DL response may be a PDCCH addressed to a specific RNTI (e.g., C-RNTI/CS-RNTI). The window/timer may be (re-)started (an offset) after the UL transmission via the CG.

In one embodiment, UE may determine beam failure for SDT is detected if the number of the counter reaches to the maximum value. The UE may be configured with a maximum value for the counter.

In one embodiment, the counter may be reset when one or more of the following criterions are satisfied:

In one embodiment, the counter may be reset when the UE successfully transmits the UL data (via the CG)

In one embodiment, the counter may be reset when a specific timer expires. The specific timer may be (re-)started when UE successfully perform the UL transmission via the CG. The specific timer may be (re-)started when the UE receives a DL response (e.g., ACK/NACK) from the NW. The DL response may be a PDCCH addressed to a specific RNTI (e.g., C-RNTI/CS-RNTI). The DL response may be received within a time period of a window/timer. The window/timer may be (re-)started (an offset) after the UL transmission via the CG.

In one embodiment, the counter may be reset when UE receives a DL response (e.g., ACK/NACK) from the NW. The DL response may be a PDCCH addressed to a specific RNTI (e.g., C-RNTI/CS-RNTI). The DL response may be received within a time period of a window/timer. The window/timer may be (re-)started (an offset) after the UL transmission via the CG.

In one embodiment, the counter may be reset when the UE enters RRC_CONNECTED and/or RRC_IDLE In one embodiment, the counter may be reset when the corresponding CG configuration/resource is released/suspended/cleared and/or the corresponding CG configuration/resource is considered as invalid.

In one embodiment, the counter may be reset when the (CG-based and/or RA based) procedure of SDT is stopped/canceled and/or when the (CG-based and/or RA based) procedure of SDT is initialized.

In one embodiment, UE may determine whether beam failure for SDT is detected by counting the number that the UE skips (and/or not generate a MAC PDU/TB) the UL transmission(s) via a CG resource.

In one embodiment, UE may maintain a counter to count the number that the UE skips the UL transmission (and/or not generate a MAC PDU/TB) via a CG resource and/or any CG resource of a CG configuration. More specifically, the counter may be configured per CG configuration and/or per CG resource. The counter may be initially set to 0.

In one embodiment, UE may increment the counter (by 1) if the UE skips the UL transmission (and/or not generate a MAC PDU/TB) via a CG resource and/or any CG resource of a CG configuration. The UE may increment the counter (by 1) if one or more of the following criteria is satisfied:

When the beam which associated with the CG resource is not qualified.

When there is no beam (for SDT) is qualified. For example, the UE determines that none of (configured) beam's RSRP is above a threshold.

When the UE is configured with a parameter for UL skipping with value true. The UE may receive the parameter for UL skipping together with CG configuration.

When the grant indicated to a HARQ entity was addressed to a C-RNTI or the grant indicated to the HARQ entity is a configured uplink grant.

When there is no aperiodic CSI requested for this PUSCH transmission as specified in 3GPP TS 38.212.

When the MAC PDU/TB includes zero MAC SDUs.

When the MAC PDU/TB includes only the periodic BSR and there is no data available for any LCG, or the MAC PDU includes only the padding BSR.

In one embodiment, UE may determine beam failure for SDT is detected if the number of the counter reaches to the maximum value. The UE may be configured with a maximum value for the counter.

In one embodiment, the counter may be reset when one or more of the following criterions are satisfied:

In one embodiment, the counter may be reset when the UE successfully transmits the UL data (via the CG)

In one embodiment, the counter may be reset when a specific timer expires. The specific timer may be (re-)started when the UE successfully perform the UL transmission via the CG. The specific timer may be (re-)started when the UE receives a DL response (e.g., ACK/NACK) from the NW. The DL response may be a PDCCH addressed to a specific RNTI (e.g., C-RNTI/CS-RNTI). The DL response may be received within a time period of a window/timer. The window/timer may be (re-)started (an offset) after the UL transmission via the CG.

In one embodiment, the counter may be reset when the UE receives a DL response (e.g., ACK/NACK) from the NW. The DL response may be a PDCCH addressed to a specific RNTI (e.g., C-RNTI/CS-RNTI). The DL response may be received within a time period of a window/timer. The window/timer may be (re-)started (an offset) after the UL transmission via the CG.

In one embodiment, the counter may be reset when the UE enters RRC_CONNECTED and/or RRC_IDLE.

In one embodiment, the counter may be reset when the corresponding CG configuration/resource is released/suspended/cleared and/or the corresponding CG configuration/resource is considered as invalid.

In one embodiment, the counter may be reset when the (CG-based and/or RA based) procedure of SDT is stopped/canceled and/or when the (CG-based and/or RA based) procedure of SDT is initialized.

UE behaviors upon beam failure for SDT is detected

In one embodiment, UE may perform one or more of the following actions in a case that the UE detects beam failure for SDT:

In one embodiment, if the beam failure for SDT is detected and/or if none of the beams (e.g., SSB) with RSRP (e.g., SS-RSRP) above the RSRP threshold (among the beams in the configured beam list), UE may skip the SDT via CG. Specifically, the UE may skip the SDT for a period of time (e.g., based on a timer and/or a back-off value). The UE may perform the beam selection and/or the CG resource selection again after the timer expires and/or after the back-off time.

In one embodiment, if the beam failure for SDT is detected and/or if none of the beams (e.g., SSB) with RSRP (e.g., SS-RSRP) above the RSRP threshold (among the beams in the configured beam list), UE may consider the CG configuration/recourse is not valid.

In one embodiment, if the beam failure for SDT is detected and/or if none of the beams (e.g., SSB) with RSRP (e.g., SS-RSRP) above the RSRP threshold (among the beams in the configured beam list), UE may consider a Timer (e.g., TAT timer or a beam valid timer) as expiry and/or stop the Timer.

Specifically, the UE may receive the value of timer in the CG configuration, in the information element associated to the beam configuration (e.g., in the CG configuration), in RRC release message (including suspendconfiguration) and/or in RRC reconfiguration message.

In one example, the timer may be a TA timer. For example, the UE may consider the TA is valid while the TA timer is running. The UE may consider the TA is not valid while the TA timer is not running.

In one example, the timer may be a window/timer for monitoring PDCCH. For example, after transmitting the UL data (e.g., small data in RRC_INACTIVE), the UE may (re)start a window/timer (e.g., configured in the CG configuration), e.g., at the first PDCCH occasion as specified in 3GPP TS 38.213 from the end of the UL data transmission. More specifically, the UE may monitor a PDCCH (e.g., on a specific search space configured in the CG configuration) by a specific RNTI (e.g., C-RNTI/CS-RNTI) while the window/timer is running.

In one example, the timer may be a beam-related timer. For example, the UE may (re-start) the timer when/after the UE performs a beam measurement and/or a beam selection. While the timer is running, the UE may not perform the beam measurement and/or the beam selection. When/After the timer expires, the UE may perform the beam measurement and/or beam selection.

In one embodiment, if the beam failure for SDT is detected and/or if none of the beams (e.g., SSB) with RSRP (e.g., SS-RSRP) above the RSRP threshold (among the beams in the configured beam list), UE may release/clear/suspend/store (all) the CG configuration/resource/occasion (for SDT).

In one embodiment, if the beam failure for SDT is detected and/or if none of the beams (e.g., SSB) with RSRP (e.g., SS-RSRP) above the RSRP threshold (among the beams in the configured beam list), UE may initiate a RA procedure (for SDT).

In one embodiment, if the beam failure for SDT is detected and/or if none of the beams (e.g., SSB) with RSRP (e.g., SS-RSRP) above the RSRP threshold (among the beams in the configured beam list), UE may initiate a RRC (connection) resume procedure.

In one example, If the beam failure for SDT is detected and/or if none of the beams (e.g., SSB) with RSRP (e.g., SS-RSRP) above the RSRP threshold (among the beams in the configured beam list) UE may initiate transmission of the RRCResumeRequest message or RRCResumeRequest1 in accordance with 5.3.13.3 of 3GPP TS 38.331.

In one embodiment, if the beam failure for SDT is detected and/or if none of the beams (e.g., SSB) with RSRP (e.g., SS-RSRP) above the RSRP threshold (among the beams in the configured beam list), UE may trigger/generate/transmit an information/report to indicate this situation (e.g., beam failure and/or none of the beam is qualified) to NW. In one embodiment, the information/report may be used to indicate the NW that the corresponding CG configuration/resource is released/suspended/deactivated by the UE. In one embodiment, the UE may trigger/initiate a RA procedure if the UE triggers this information/report. More specifically, the information/report may be transmitted via Msg3 and/or MsgA. In one embodiment, the information/report may be transmitted via RRC signaling, MAC CE, and/or PHY signaling.

In one embodiment, if the beam failure for SDT is detected and/or if none of the beams (e.g., SSB) with RSRP (e.g., SS-RSRP) above the RSRP threshold (among the beams in the configured beam list), UE may ramp the power (in dB) to perform the SDT. How much power (dB) to ramp may be based on a preconfigured parameter (e.g., in CG configuration and/or RRC release message). For example, the preconfigured parameter may be a pow erRampingStep In one embodiment, if the beam failure for SDT is detected and/or if none of the beams (e.g., SSB) with RSRP (e.g., SS-RSRP) above the RSRP threshold (among the beams in the configured beam list), the UE may initiate/perform cell reselection procedure. For example, the UE may keep in RRC_INACTIVE and perform cell reselection. For another example, the UE may enter RRC_IDLE and perform cell reselection.

In one embodiment, the procedure to detect beam failure for SDT may be initiated/triggered when UE triggers/initiates the procedure for (CG-based) SDT. In one embodiment, the procedure to detect beam failure for SDT may be initiated/triggered when UE receives the CG configuration (for SDT). In one embodiment, the procedure to detect beam failure for SDT may be initiated/triggered when UE receives the RRC release (with suspendconfig) message. In one embodiment, UE may only perform the procedure for CG-based SDT.

CG (Re-)initialization

In some embodiments, if a CG has been suspended (e.g., instead of released/discarded/cleared), the CG may be (re-)initialized, e.g., by NW, based on one or more of the following conditions(s). For example, the UE may (re-)initialize any suspended configured grant of configured grant Type 1 based on one or more of the following condition(s).

In one embodiment, UE may (re-)initialized a CG when/after receiving a specific indication from NW In one embodiment, UE may receive a specific indication from NW, and the specific indication may indicate to (re-)initialize one or more of the (suspended) CG configuration/resource. In one embodiment, the specific indication may be received via SIB, RRC release message, RRC reconfiguration message, a MAC CE, and/or a DCI.

In one embodiment, UE may (re-)initialized a CG after the CG (and/or its associated beam) is determined as valid.

In one embodiment, UE may (re-)initialize a (suspended) CG which is associated with a beam in a case that the UE determines the channel quality (e.g., RSRP) of the beam is higher than a threshold.

In one embodiment, UE may (re-)initialize a (suspended) CG which is associated with a beam in a case that the UE selects the beam for performing an UL transmission for SDT.

In one embodiment, UE may (re-)initialized a CG after transmitting a specific indication to NW.

In one embodiment, UE may (re-)initialize a (suspended) CG (which is associated with a beam) after transmitting a specific indication to NW.

In one embodiment, the specific indication may be a beam measurement report. The specific indication may indicate that a beam is qualified. Then the UE may (re-)initialize a (suspended) CG (which is associated with the qualified beam).

In one embodiment, the specific indication may be a request message. The specific indication may be used to indicate that the CG (associated with a beam) is valid.

In one embodiment, UE may (re-)initialized a CG after the UE selects a specific carrier (e.g., NUL/SUL).

In one embodiment, a first CG configuration/resource may be configured for the NUL carrier, and a second CG configuration/resource may be configured for the SUL carrier. UE may suspend the first CG configuration/resources, e.g., if the UE does not select a first carrier (e.g., NUL) associated with the first CG configuration/resources. Then, the UE may (re-)initialized the first CG configuration/resources after the UE selects the first carrier (e.g., NUL) again.

CG Valid Determination

In one embodiment, UE may determine whether a CG resource/configuration is valid based on one or more of the following criterions:

In one embodiment, whether a CG resource/configuration is valid is determined based on whether the associated beam is valid. Whether the associated beam is valid may be based on a RSRP threshold.

In one example, if there is at least one beam with RSRP above the RSRP threshold, the UE may consider the CG resource/configuration is valid.

In one example, if there is no beam with RSRP above the RSRP threshold, the UE may consider the CG resource/configuration is not valid.

In one embodiment, whether a CG resource/configuration is valid is determined based on whether TA is valid. UE may determine the CG resource/configuration is valid while the TA is valid. If the TA is not valid, the UE may consider the CG resource/configuration is not valid.

In one embodiment, whether a TA is valid may be based on a TA timer. For example, the UE may consider the TA is valid while the TA timer is running. The UE may consider the TA is not valid while the TA timer is not running.

In one embodiment, whether a TA is valid may be based on a RSRP change volume. For example, the UE may consider the TA is not valid if the RSRP change volume is higher than a threshold.

In one embodiment, whether a CG resource/configuration is valid is determined based on whether CG resource/configuration is valid.

In one embodiment, when the CG resource configuration is initialized, the CG resource configuration may be valid.

In one embodiment, when the CG resource configuration is released/suspended, the CG resource configuration may be invalid.

In one embodiment, when a UE is in a specific carrier (e.g., NUL or SUL) or selected the specific carrier (for SDT), the CG resource/configuration configured for the specific carrier may be considered valid, and the CG resource/configuration configured for the other carrier may be consider invalid.

In one embodiment, whether a CG resource/configuration is valid is determined based on whether data is available for transmission for only those DRBs for which SDT is enabled.

In one embodiment, UE may be configured with one or more DRBs/LCHs specifically for SDT.

In one embodiment, whether a CG resource/configuration is valid is determined based on whether a RSRP is larger than the configured RSRP threshold for SDT In one embodiment, whether a CG resource/configuration is valid is determined based on whether data volume for transmission is lower than a configured threshold for SDT In one embodiment, whether a CG resource/configuration is valid is determined based on an (explicit) indication received from NW.

In one embodiment, the indication may indicate that a CG (associated with a beam) is valid or not. The indication my indicate whether a beam associated with a CG is valid or not.

In one embodiment, whether a CG resource/configuration is valid is determined based on whether a timer (e.g., T319 or a timer similar to T319) is running.

In one embodiment, UE may consider that the CG resource/configuration is valid while the timer is running. The UE may consider that CG resource/configuration is not valid while the timer is not running or when the timer expires.

In one embodiment, if a change of RSRP (i.e., RSRP change volume) is not more than a RSRP threshold, UE may consider that the CG resource/configuration is not valid. In one embodiment, the RSRP threshold used for comparing with the change of RSRP is indicated by a configuration for SDT from NW.

In one embodiment, if CG resource is configured on a selected UL carrier, UE may consider that the CG resource/configuration is valid. In one embodiment, the selected UL carrier may be a normal uplink (NUL) carrier or a supplementary uplink (SUL) carrier.

In one embodiment, the timer may be used to detect the failure of the SDT.

In one embodiment, the timer may be (re-)started upon transmission of UL data when the UE is in RRC_INACTIVE. The timer may be (re-)started upon transmission of small data. The timer may be (re-)started upon transmission of RRC resume request.

In one embodiment, the timer may be stopped upon reception of RRCResume, RRCSetup, RRCRelease, RRCRelease with suspendConfig or RRCReject message, cell re-selection and upon abortion of connection establishment by upper layers.

In one embodiment, when the timer expires, UE may enter the action upon going to RRC_IDLE (e.g., with a specific RRC resume cause).

Figure 11:
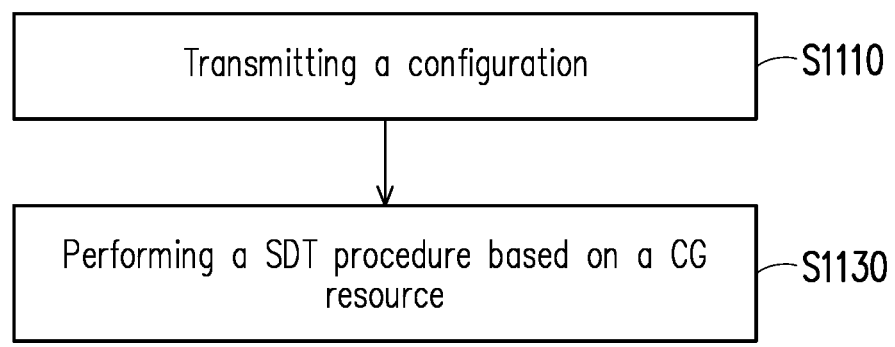
FIG. 11 is a flow chart of a method adapted for network for SDT according to one of the exemplary embodiments of the disclosure.

FIG. 11 is a flow chart of a method adapted for network for SDT according to one of the exemplary embodiments of the disclosure. Referring to FIG. 11, the network (e.g., BS) transmits a configuration to UE (step S1110). The configuration indicates a first RSRP threshold. The network performs a SDT procedure based on a CG resource in response to a RSRP of a DL pathloss reference being higher than the first RSRP threshold (step S1130). The details of step S1110 to step S1130 could be referred to FIG. 8-FIG. 10 and would be omitted.

Figure 12:
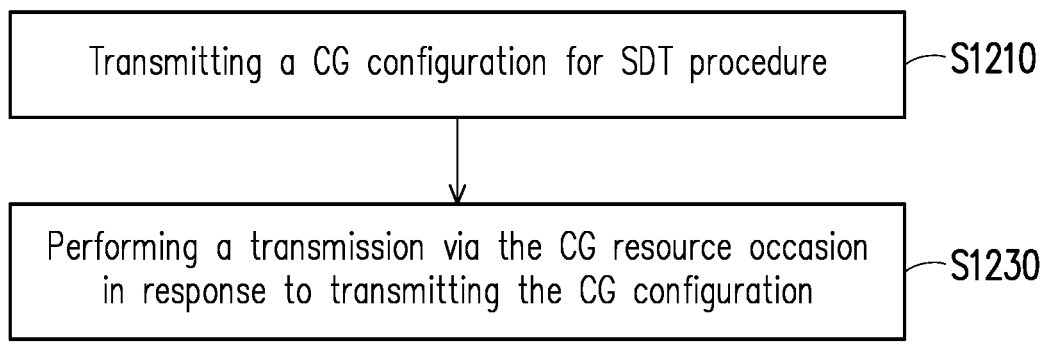
FIG. 12 is a flow chart of a method adapted for network for SDT according to one of the exemplary embodiments of the disclosure.

FIG. 12 is a flow chart of a method adapted for network for SDT according to one of the exemplary embodiments of the disclosure. Referring to FIG. 12, the network (e.g., BS) transmits a CG configuration for SDT to UE (step S1210). The network performs a transmission via the CG resource/occasion in response to transmitting the CG configuration (step S1230). The details of step S1210 to step S1250 could be referred to FIG. 8-FIG. 10 and would be omitted.

Subsequent Data Transmission

In one embodiment, for SDT, UE may send an assistance information/report (e.g., an indication, a BSR, and/or a PHR) to NW to indicate whether there is subsequent data. Thus, there are some issues, e.g., How to determine whether there is subsequent data or not by the UE.

How to trigger/generate the assistance information/report the NW if there is subsequent data.

What information should be included in the assistance information (e.g., an indication and/or a BSR).

How to determine whether there is subsequent data

In some embodiments, UE may determine whether there is subsequent data based on one or more of the following embodiments:

In one embodiment, UE may determine whether there is subsequent data based on whether UL data, for a SRB/DRB/LCH (which belongs to an LCG), becomes available (to the MAC entity) and/or the UL data belongs to a LCH with higher priority than the priority of any LCH containing available UL data which belong to any LCG.

In one embodiment, the SRB/DRB(s), the LCH(s), and/or the LCG(s) may be (specifically) configured for SDT.

In one embodiment, UE may only consider the SRB/DRB(s), the LCH(s), and/or the LCG(s) which are configured for SDT for determining the UL data.

In one embodiment, UE may not consider the SRB/DRB(s), the LCH(s), and/or the LCG(s) which are not configured for SDT for determining the UL data.

In one embodiment, UE may determine whether there is subsequent data based on whether UL data, for a DRB/LCH (which belongs to an LCG), becomes available (to the MAC entity) and/or none of the LCHs which belong to an LCH contains any available UL data.

In one embodiment, the SRB/DRB(s), the LCH(s), and/or the LCG(s) may be (specifically) configured for SDT.

In one embodiment, UE may only consider the SRB/DRB(s), the LCH(s), and/or the LCG(s) which are configured for SDT for determining the UL data.

In one embodiment, UE may not consider the SRB/DRB(s), the LCH(s), and/or the LCG(s) which are not configured for SDT for determining the UL data.

In one embodiment, UE may determine whether there is subsequent data based on whether data volume (for the DRB, the LCH, and/or the LCH) is higher or lower than a threshold.

In one embodiment, the SRB/DRB(s), the LCH(s), and/or the LCG(s) may be (specifically) configured for SDT.

In one embodiment, UE may only consider the SRB/DRB(s), the LCH(s), and/or the LCG(s) which are configured for SDT for determining the data volume.

In one embodiment, UE may not consider the SRB/DRB(s), the LCH(s), and/or the LCG(s) which are not configured for SDT for determining the data volume.

In one embodiment, UE may determine whether there is subsequent data based on whether the UE has (more) data to send or receive in the near future.

In one embodiment, the SRB/DRB(s), the LCH(s), and/or the LCG(s) may be (specifically) configured for SDT.

In one embodiment, UE may only consider the SRB/DRB(s), the LCH(s), and/or the LCG(s) which are configured for SDT for determining whether there is data to send or receive in the near future.

In one embodiment, UE may not consider the SRB/DRB(s), the LCH(s), and/or the LCG(s) which are not configured for SDT for determining whether there is data to send or receive in the near future.

In one embodiment, UE may determine whether there is subsequent data based on whether subsequent DL or UL transmission is expected.

In one embodiment, the SRB/DRB(s), the LCH(s), and/or the LCG(s) may be (specifically) configured for SDT.

In one embodiment, UE may only consider the SRB/DRB(s), the LCH(s), and/or the LCG(s) which are configured for SDT for determining whether subsequent DL or UL transmission is expected.

In one embodiment, UE may not consider the SRB/DRB(s), the LCH(s), and/or the LCG(s) which are not configured for SDT for determining whether subsequent DL or UL transmission is expected.

In one embodiment, the SRB/DRB(s), the LCH(s), and/or the LCG(s) may be (specifically) configured for SDT. In one embodiment, UE may only consider the DRB(s), the LCH(s), and/or the LCG(s) which are configured for SDT for determining whether there is subsequent data. In one embodiment, UE may not consider the DRB(s), the LCH(s), and/or the LCG(s) which are not configured for SDT for determining whether there is subsequent data.

How to trigger the assistance information/report

In some embodiments, UE may trigger/generate/transmit an assistance information/report based on one or more of the following embodiments:

In one embodiment, UE may trigger/generate/transmit the assistance information/report if the UE determines there is subsequent data.

In one example, UE may trigger/generate/transmit the assistance information/report if UL data, for a SRB/DRB/LCH (which belongs to an LCG), becomes available (to the MAC entity) and/or the UL data belongs to a LCH with higher priority than the priority of any LCH containing available UL data which belong to any LCG.

In one example, UE may trigger/generate/transmit the assistance information/report if UL data, for a SRB/DRB/LCH (which belongs to an LCG), becomes available (to the MAC entity) and/or none of the LCHs which belong to an LCH contains any available UL data.

In one example, UE may trigger/generate/transmit the assistance information/report if data volume (for the SRB/DRB, the LCH, and/or the LCH) is higher or lower than a threshold.

In one example, UE may trigger/generate/transmit the assistance information/report if the UE has (more) data to send or receive in the near future.

In one example, UE may trigger/generate/transmit the assistance information/report if subsequent DL or UL transmission is expected.

In one embodiment, the SRB/DRB(s), the LCH(s), and/or the LCG(s) may be (specifically) configured for SDT. In one embodiment, UE may only consider the SRB/DRB(s), the LCH(s), and/or the LCG(s) which are configured for SDT for determining whether triggering/generating/transmitting the assistance information/report. In one embodiment, UE may not consider the SRB/DRB(s), the LCH(s), and/or the LCG(s) which are not configured for SDT for determining whether triggering/generating/transmitting the assistance information/report.

In one example, if a UE has been configured with a specific IE to allow for transmission of a assistant information/report on msg3/MSGA, the UE may always trigger a assistance information/report, and cancel the triggered assistance information/report after transmitting the assistance information/report on msg3/MSGA.

In one embodiment, UE may trigger/generate/transmit the assistance information/report if a first timer (e.g., a restriction timer) is not running. The UE may not trigger/generate/transmit the assistance information/report if a first timer (e.g., a restriction timer) is running.

In one embodiment, the first timer may be (re-)started when/after the UE transmits the assistance information/report.

In one embodiment, UE may trigger/generate/transmit the assistance information/report if a second timer (e.g., a periodic timer or a retransmission timer) expires.

In one embodiment, the second timer may be (re-)started when/after the UE transmits the assistance information/report.

What information should be included in the assistance information/report

In one embodiment, the assistance information/report may be used to provide the serving gNB with information whether subsequent DL and/or UL transmission is expected.

In one embodiment, the assistance information/report may be an indication with zero or one or multiple bit(s), or codepoint/index.

In one embodiment, the assistance information/report may be used to indicate whether there is subsequent data.

In one embodiment, the assistance information/report may be used to indicate whether DL and/or UL data transmission is expected.

In one embodiment, the assistance information/report may be a BSR.

In one embodiment, the Buffer Status reporting (BSR) procedure is used to provide the serving gNB with information about UL data volume in the MAC entity as illustrated in 3GPP TS 38.321.

In one embodiment, the BSR may be a regular BSR, a periodic BSR, and/or a padding BSR.

In one embodiment, the Buffer Status Report (BSR) MAC CEs may consist of either:

Short BSR format (fixed size); or
Long BSR format (variable size); or
Short Truncated BSR format (fixed size); or
Long Truncated BSR format (variable size).

In one embodiment, the assistance information/report (e.g., buffer size field) may indicate the total amount of data available according to the data volume calculation procedure in 3 GPP TS 38.322 and TS 38.323 across all logical channels of a logical channel group after the MAC PDU has been built (i.e., after the logical channel prioritization procedure, which may result the value of the Buffer Size field to zero). The amount of data is indicated in number of bytes. The size of the RLC headers and MAC subheaders are not considered in the buffer size computation. Alternatively, the assistance information/report (e.g., buffer size field) may indicate the total amount of data available according to the data volume calculation procedure in 3GPP TS 38.322 and TS 38.323 across the logical channels (which are configured for SDT) of a logical channel group (which is configured for SDT) after the MAC PDU has been built (i.e., after the logical channel prioritization procedure, which may result the value of the Buffer Size field to zero). The amount of data is indicated in number of bytes. The size of the RLC headers and MAC subheaders are not considered in the buffer size computation.

In one embodiment, the assistance information/report may be a PER.

In one embodiment, the Power Headroom reporting procedure may be used to provide the serving gNB with the following information:

Type 1 power headroom: the difference between the nominal UE maximum transmit power and the estimated power for UL-SCH transmission per activated Serving Cell;

Type 2 power headroom: the difference between the nominal UE maximum transmit power and the estimated power for UL-SCH and PUCCH transmission on SpCell of the other MAC entity (i.e. E-UTRA MAC entity in EN-DC, NE-DC, and NGEN-DC cases);

Type 3 power headroom: the difference between the nominal UE maximum transmit power and the estimated power for SRS transmission per activated Serving Cell;

MPE P-MPR: the power backoff applied by the UE to meet the MPE FR2 requirements for a Serving Cell.

In one embodiment, the assistance information/report may be a beam report.

In one embodiment, the assistance information/report may indicate the (selected) (one or more) SSB (index).

In one embodiment, the assistance information/report may include a field to indicate the presence of the SSB index field. For example, if at least one of the SSBs with SS-RSRP above a threshold among the SSBs in the configured SSB resource list (e.g., include CG-SSB-resource), the field may be set to a first value (e.g., 1); otherwise, it may be set to a second value (e.g., 0).

In one embodiment, the assistance information/report may include a field set to the index of a SSB with SS-RSRP above rsrp-ThresholdBFR (amongst the SSBs in the configured SSB resource list (e.g., include CG-SSB-resource)).

In one embodiment, the assistance information/report may indicate the SSB index and its measurement result (e.g., the value of RSRP).

In one embodiment, the assistance information/report may be transmitted via RRC signaling/MAC CE/PHY signaling.

In one embodiment, the assistance information/report may be transmitted via the first CG resource/occasion.

In one embodiment, the assistance information/report may be used to inform the NW which SSB is qualified, then the NW may transmit the DL singling to the UE based on this SSB.

In one embodiment, the assistance information/report may indicate traffic pattern (e.g., traffic periodicity, traffic offset, number of resources, amount of data, etc.)

In one embodiment, the assistance information/report may be triggered by upper layer (e.g., RRC layer) and/or by MAC entity.

In one embodiment, the assistance information/report may be a PHY signaling/MAC CE/RRC signaling.

In one embodiment, if UE determines there is no subsequent data, the UE may cancel the triggered assistance information/report. Moreover, the UE may cancel the triggered assistance information/report only if the NW has configured a specific IE to the UE. The specific IE may be configured in RRCRelease message (with suspend configuration).

In one embodiment, if the UE determines there is no subsequent data, the UE may trigger/generate/transmit the BSR with a buffer size of zero bytes.

In one embodiment, UE may generate a short BSR format, a Long BSR format (variable size), Short Truncated BSR format (fixed size), or a Long Truncated BSR format (variable size).

In one embodiment, UE may set the value of all LCH ID/LCHi field (in the BSR MAC CE) to 1 or to 0. Alternatively, the UE may set the value of the LCH ID/LCHi (which is configured for SDT) field(s) (in the BSR MAC CE) to a specific value (e.g., 0 or 1).

In one embodiment, UE may set the field of buffer size (in the BSR MAC CE) to a specific value (e.g., 0).

In one embodiment, if UE determines there is no subsequent data, the UE may not trigger/generate/transmit the assistance information/report.

In one embodiment, when the assistance information/report has been triggered, the assistance information/report may have higher priority than data from any Logical Channel, except data from UL-CCCH, e.g., only if after logical channel prioritization including the assistance information/report in the resulting MAC PDU does not require segmenting RLC SDU. Otherwise, data from a LCH(s) may have higher priority than the assistance information/report.

In one embodiment, for SDT (e.g., via CG), the assistance information/report is triggered but is not included in the resulting MAC PDU with the MAC SDU as a result of logical channel prioritization, the (triggered) assistance information/report may be cancelled.

In one embodiment, after transmitting the UL data (e.g., small data in RRC_INACTIVE), e.g., including the assistance information/report, UE may (re)start a window/timer (e.g., configured in the CG configuration), e.g., at the first PDCCH occasion as specified in 3GPP TS 38.213 from the end of the UL data transmission. In one embodiment, UE may monitor a PDCCH (e.g., on a specific search space configured in the CG configuration) by a specific RNTI (e.g., C-RNTI/CS-RNTI) while the window/timer is running.

In one embodiment, UE may (re)start a window/timer and/or monitor the PDCCH if the assistance information/report indicates the buffer size is larger than 0.

In one embodiment, UE may not (re)start a window/timer and/or monitor the PDCCH if the assistance information/report indicates the buffer size is 0.

In one embodiment, for the monitoring of the PDCCH, UE may attempt to detect a specific DCI (e.g., DCI format 1_0) with CRC scrambled by a specific RNTI (e.g., C-RNTI/CS-RNTI) during the window/timer.

Dependency

In one embodiment, one or more of the above mentioned (specific) counter may be reset when the UE performs cell (re)-selection or RAN notification area (RNA) update procedure.

In one embodiment, one or more of the above mentioned (specific) counter may be reset when UE changes the serving cell to another cell or when the UE camps on a new (suitable/acceptable) cell.

In one embodiment, one or more of the above mentioned (specific) counter may be reset when UE determines the CG resource/configuration is not valid or when the received signal quality (e.g., RSRP/RSRQ) of all the configured SSBs are below the corresponding threshold(s).

In one embodiment, one or more of the above mentioned (specific) counter may be reset when UE transitions the RRC state from RRC inactive to RRC idle or RRC connected (e.g., when receiving the RRC release message and/or a RRC resume message, and/or a specific timer (e.g., T319) expires) (e.g., the UE may not change the serving/camped cell in this case).

In one embodiment, one or more of the above mentioned (specific) counter may be reset when UE performs MAC reset.

In one embodiment, one or more of the above mentioned (specific) counter may be reset when UE initiates a RA/CG procedure (for SDT).

In one embodiment, one or more of the above mentioned (specific) counter may be reset when UE considers the procedure (for SDT, for CG-based SDT, and/or for RA-based SDT) is successful/unsuccessful.

In one embodiment, one or more of the above mentioned (specific) counter may be reset when UE stops the procedure (for SDT, for CG-based SDT, and/or for RA-based SDT).

In one embodiment, one or more of the above mentioned (specific) counter may be reset when UE switches/selects from NUL to SUL and/or from SUL/to NUL. For example, one or more of the above mentioned (specific) counter may be configured via SIB, RRC release (with suspendconfig) message, RRC reconfiguration, DCI, and/or CG configuration. For another example, one or more of the above mentioned (specific) counter may be reset when the beam configuration (that corresponds to the counter) is released/reconfigured.

In one example, NW may reconfigure the beam configuration via RRCRelease message. For example, one or more of the above mentioned (specific) counter may be reset when the CG configuration (that corresponds to the counter) is reconfigured by the NW.

In one example, NW may reconfigure the beam configuration via RRCRelease message. For example, one or more of the above mentioned (specific) counter may be reset when to UE receives a specific indication to indicate that CG transmission in RRC_INACTIVE is no longer supported at the serving cell.

In one embodiment, one or more of the above mentioned (specific) timer may be (re-)start/stopped when UE performs cell (re)-selection or RAN notification area (RNA) update procedure.

In one embodiment, one or more of the above mentioned (specific) timer may be (re-)start/stopped when UE changes the serving cell to another cell or when the UE camps on a new (suitable/acceptable) cell.

In one embodiment, one or more of the above mentioned (specific) timer may be (re-)start/stopped when UE determines the CG resource/configuration is not valid or when the received signal quality (e.g., RSRP/RSRQ) of all the configured SSBs are below the corresponding threshold(s).

In one embodiment, one or more of the above mentioned (specific) timer may be (re-)start/stopped when UE transitions the RRC state from RRC inactive to RRC idle or RRC connected (e.g., when receiving the RRC release message and/or a RRC resume message, and/or a specific timer (e.g., T319) expires) (e.g., the UE may not change the serving/camped cell in this case).

In one embodiment, one or more of the above mentioned (specific) timer may be (re-)start/stopped when UE performs MAC reset. In one embodiment, one or more of the above mentioned (specific) timer may be (re-)start/stopped when the UE initiates a RA/CG procedure (for SDT).

In one embodiment, one or more of the above mentioned (specific) timer may be (re-)start/stopped when UE considers the procedure (for SDT, for CG-based SDT, and/or for RA-based SDT) is successful/unsuccessful.

In one embodiment, one or more of the above mentioned (specific) timer may be (re-)start/stopped when UE stops the procedure (for SDT, for CG-based SDT, and/or for RA-based SDT).

In one embodiment, one or more of the above mentioned (specific) timer may be (re-)start/stopped when UE switches/selects from NUL to SUL and/or from SUL/to NUL. For example, one or more of the above mentioned (specific) timer may be configured via SIB, RRC release (with suspendconfig) message, RRC reconfiguration, DCI, and/or CG configuration. For another example, one or more of the above mentioned (specific) timer may be (re-)start/stopped when the beam configuration (that corresponds to the counter) is released/reconfigured.

In one example, NW may reconfigure the beam configuration via RRCRelease message. For example, one or more of the above mentioned (specific) timer may be (re-)start/stopped when the CG configuration (that corresponds to the counter) is reconfigured by NW.

In one example, NW may reconfigure the beam configuration via RRCRelease message. For example, one or more of the above mentioned (specific) timer may be (re-)start/stopped when the UE receives a specific indication to indicate that CG transmission in RRC_INACTIVE is no longer supported at the serving cell.

In one embodiment, NW may also maintain the above mentioned (specific) counter and/or timer. The actions for the above mentioned (specific) counter and/or timer may be the same for both UE and NW.

In one embodiment, NW may also release release/suspend/discard/clear the CG resource/occasion based on the same condition/criterions as mentioned in this disclosure for the UE.

In one embodiment, the "resource" and the "occasion" may be interchangeably used in some embodiments of the present disclosure In one embodiment, the "beam", "SSB", "TRS", "CSI-RS", "assistance RS", and "TCI-state" may be interchangeably used in some embodiments of the present disclosure.

Figure 13:
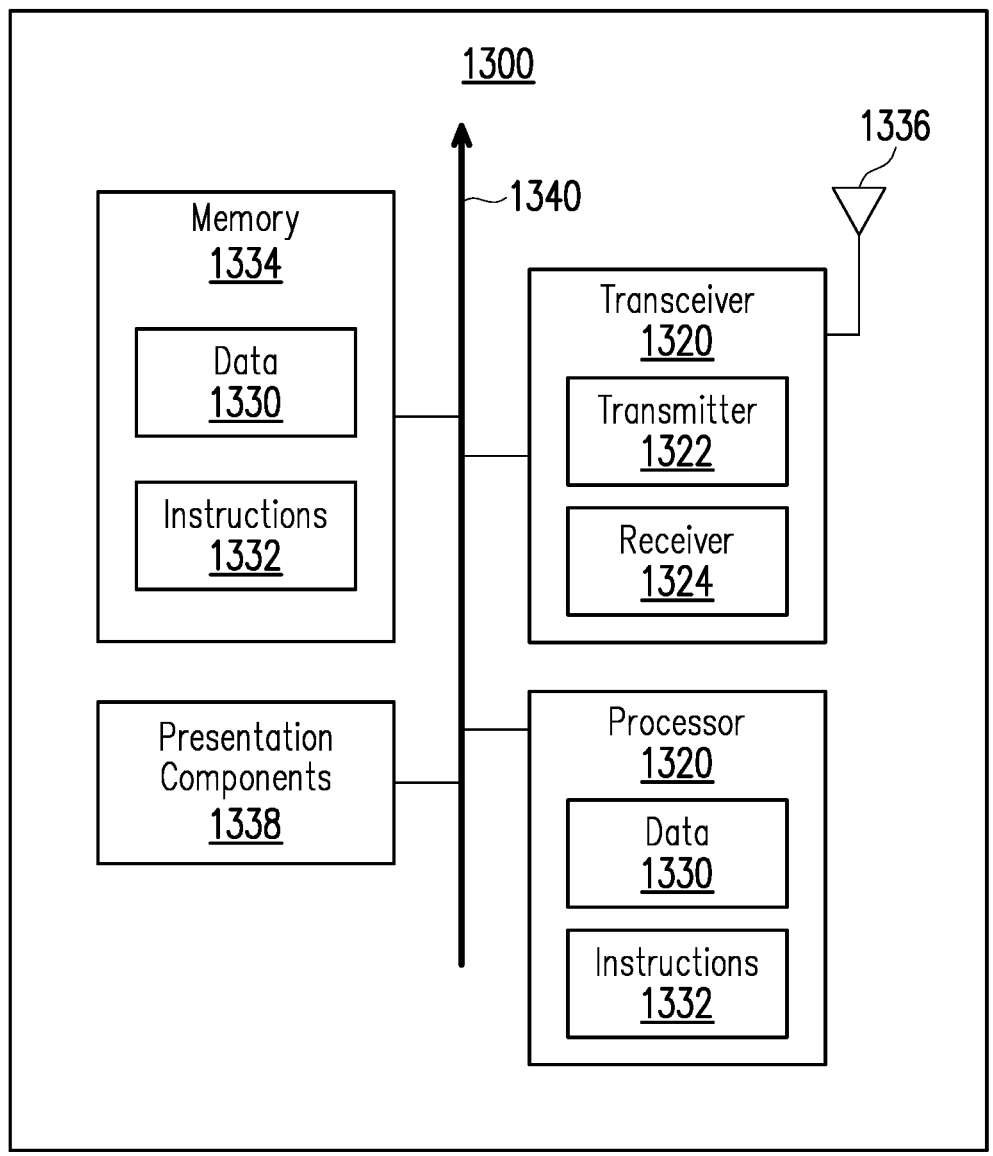
FIG. 13 illustrates a block diagram of a node for wireless communication, in accordance with various aspects of the present application.

In one embodiment, the "associated with", "corresponding to", and "mapped to" may be interchangeably used in some embodiments of the present disclosure FIG. 13 illustrates a block diagram of a node for wireless communication, in accordance with various aspects of the present application. As shown in FIG. 13, a node 1300 may include a transceiver 1320, a processor 1328, a memory 1334, one or more presentation components 1338, and at least one antenna 1336. The node 1300 may also include an RF spectrum band module, a base station communications module, a network communications module, and a system communications management module, Input/Output (I/O) ports, I/O components, and power supply (not explicitly shown in FIG. 13). Each of these components may be in communication with each other, directly or indirectly, over one or more buses 1340. In one embodiment, the node 1300 may be a UE or a base station that performs various functions described herein, for example, with reference to FIGS. 1 through 12.

The transceiver 1320 having a transmitter 1322 (e.g., transmitting/transmission circuitry) and a receiver 1324 (e.g., receiving/reception circuitry) may be configured to transmit and/or receive time and/or frequency resource partitioning information. In some embodiments, the transceiver 1320 may be configured to transmit in different types of subframes and slots including, but not limited to, usable, non-usable and flexibly usable subframes and slot formats. The transceiver 1320 may be configured to receive data and control channels.

The node 1300 may include a variety of computer-readable media. Computer-readable media can be any available media that can be accessed by the node 1300 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1334 may include computer-storage media in the form of volatile and/or non-volatile memory. The memory 1334 may be removable, non-removable, or a combination thereof. Exemplary memory includes solid-state memory, hard drives, optical-disc drives, and etc. As illustrated in FIG. 13, The memory 1334 may store computer-readable, computer-executable instructions 1332 (e.g., software codes) that are configured to, when executed, cause the processor 1328 to perform various functions described herein, for example, with reference to FIGS. 1 through 12. Alternatively, the instructions 1332 may not be directly executable by the processor 1328 but be configured to cause the node 1300 (e.g., when compiled and executed) to perform various functions described herein.

The processor 1328 (e.g., having processing circuitry) may include an intelligent hardware device, e.g., a Central Processing Unit (CPU), a microcontroller, an ASIC, and etc. The processor 1328 may include memory. The processor 1328 may process the data 1330 and the instructions 1332 received from the memory 1334, and information through the transceiver 1320, the base band communications module, and/or the network communications module. The processor 1328 may also process information to be sent to the transceiver 1320 for transmission through the antenna 1336, to the network communications module for transmission to a core network.

One or more presentation components 1338 presents data indications to a person or other device. Exemplary presentation components 1338 include a display device, speaker, printing component, vibrating component, etc.

From the above description, it is manifested that various techniques may be used for implementing the concepts described in the present application without departing from the scope of those concepts. Moreover, while the concepts have been described with specific reference to certain embodiments, a person of ordinary skill in the art would recognize that changes may be made in form and detail without departing from the scope of those concepts. As such, the described embodiments are to be considered in all respects as illustrative and not restrictive. It should also be understood that the present application is not limited to the particular embodiments described above, but many rearrangements, modifications, and substitutions are possible without departing from the scope of the present disclosure.

What is claimed is:

1. A method performed by a user equipment (UE) for small data transmission (SDT), the method comprising:
   receiving a configuration from a base station (BS), the configuration indicating a first reference signal received power (RSRP) threshold and a second RSRP threshold;
   initiating an SDT procedure based on a configured grant (CG) resource in response to an RSRP of a downlink (DL) pathloss reference being higher than the first RSRP threshold;
   in response to initiating the SDT procedure based on the CG resource:
      selecting a synchronization signal/physical broadcast channel block (SSB) from an SSB set in a case that the SSB has a first RSRP above the second RSRP threshold, and
      considering the CG resource as not being valid and initiating a random access (RA) procedure in response to none of SSBs in the SSB set having a respective RSRP above the second RSRP threshold.

2. The method according to claim 1, wherein receiving the configuration from the BS comprises receiving the configuration from the BS via a radio resource control (RRC) release message.

3. The method according to claim 1, wherein the SSB set is configured, by the BS, via a radio resource control (RRC) release message or via system information.

4. The method according to claim 1, further comprising:
   selecting a CG resource occasion corresponding to the selected SSB in the case that the first RSRP is above the second RSRP threshold.

5. The method according to claim 1, wherein the first RSRP threshold is configured by an SDT configuration included in the configuration.

6. The method according to claim 1, wherein the second RSRP threshold is configured by a CG configuration included in the configuration.

7. The method according to claim 1, wherein the configuration further indicates a third RSRP threshold, the method further comprising:
   determining the CG resource is valid in response to a change of the RSRP not being more than the third RSRP threshold.

8. The method according to claim 1, further comprising:
   determining the CG resource is valid in response to the CG resource being configured on a selected uplink (UL) carrier.

9. The method according to claim 8, wherein the selected UL carrier is one of a normal uplink (NUL) carrier and a supplementary uplink (SUL) carrier.

10. A user equipment (UE), comprising:
    a transceiver, used for transmitting or receiving signals;
    at least one processor, coupled to the transceiver; and
    at least one non-transitory computer-readable medium coupled to the at least one processor and storing one or more computer-executable instructions that, when executed by the at least one processor, cause the UE to:
       receive, through the transceiver, a configuration from a base station (BS), the configuration indicating a first reference signal received power (RSRP) threshold and a second RSRP threshold;

initiate an SDT procedure via a configured grant (CG) resource in response to an RSRP of a downlink (DL) pathloss reference being higher than the first RSRP threshold;
in response to initiating the SDT procedure via the CG resource:
 select a synchronization signal/physical broadcast channel block (SSB) from an SSB set in a case that the SSB has a first RSRP above the second RSRP threshold, and
 consider the CG resource as not being valid and initiate a random access (RA) procedure in response to none of SSBs in the SSB set having a respective RSRP above the second RSRP threshold.

11. The UE according to claim 10, wherein receiving the configuration from the BS comprises receiving the configuration from the BS via a radio resource control (RRC) release message.

12. The UE according to claim 10, wherein the SSB set is configured, by the BS, via a radio resource control (RRC) release message or via system information.

13. The UE according to claim 10, wherein the one or more computer-executable instructions, when executed by the at least one processor, further cause the UE to:
 select a CG resource occasion corresponding to the selected SSB in the case that the first RSRP is above the second RSRP threshold.

14. The UE according to claim 10, wherein the first RSRP threshold is configured by an SDT configuration included in the configuration.

15. The UE according to claim 10, wherein the second RSRP threshold is configured by a CG configuration included in the configuration.

16. The UE according to claim 10, wherein:
the configuration further indicates a third RSRP threshold, and
the one or more computer-executable instructions, when executed by the at least one processor, further cause the UE to:
determine the CG resource is valid in response to a change of the RSRP not being more than the third RSRP threshold.

17. The UE according to claim 10, wherein the one or more computer-executable instructions, when executed by the at least one processor, further cause the UE to:
determine the CG resource is valid in response to the CG resource being configured on a selected uplink (UL) carrier.

18. The UE according to claim 17, the selected UL carrier is one of a normal uplink (NUL) carrier and a supplementary uplink (SUL) carrier.

* * * * *